United States Patent
Naruke

(10) Patent No.: US 6,740,148 B2
(45) Date of Patent: May 25, 2004

(54) EXHAUST GAS CLEANER

(75) Inventor: Mutsuyo Naruke, Ibaraki (JP)

(73) Assignee: NASA Auto, Ibarahi (JP)

( * ) Notice: Subject to any disclaimer, the term of this patent is extended or adjusted under 35 U.S.C. 154(b) by 39 days.

(21) Appl. No.: 10/088,999

(22) PCT Filed: Dec. 6, 2001

(86) PCT No.: PCT/JP00/06490
§ 371 (c)(1),
(2), (4) Date: Mar. 22, 2002

(87) PCT Pub. No.: WO01/21289
PCT Pub. Date: Mar. 29, 2001

(65) Prior Publication Data
US 2003/0010214 A1 Jan. 16, 2003

(30) Foreign Application Priority Data

| Sep. 24, 1999 | (JP) | ............................................ | 11-270885 |
| Jul. 3, 2000 | (JP) | ........................................ | 2000-200799 |

(51) Int. Cl.[7] .............................................. B01D 47/02
(52) U.S. Cl. ............................. 96/337; 96/338; 96/339; 96/340; 96/344; 96/353
(58) Field of Search .............................. 95/226; 96/329, 96/330, 333, 337, 338, 339, 340, 341, 342, 343, 344, 345, 348, 349, 350, 351, 352, 353, 354

(56) References Cited

U.S. PATENT DOCUMENTS

| 1,423,696 | A | * | 7/1922 | Stevens |
| 2,239,620 | A | * | 4/1941 | Neumann |
| 2,250,226 | A | * | 7/1941 | Juelson |
| 2,911,289 | A | * | 11/1959 | Forry |
| 3,332,214 | A | * | 7/1967 | Huppke |
| 3,793,809 | A | * | 2/1974 | Tomany et al. |
| 4,139,353 | A | * | 2/1979 | Garner |
| 4,375,977 | A | * | 3/1983 | Honerkamp et al. |
| 4,432,777 | A | * | 2/1984 | Postma |
| 4,439,215 | A | * | 3/1984 | Rawicki |
| 4,661,130 | A | * | 4/1987 | Ebeling et al. |
| 5,129,926 | A | * | 7/1992 | Harwell |
| 5,268,010 | A | * | 12/1993 | Zengerer |
| 5,453,107 | A | * | 9/1995 | Liu |
| 5,669,946 | A | * | 9/1997 | Blair, Jr. |
| 5,908,491 | A | * | 6/1999 | Hobbs |
| 2003/0010214 | A1 | * | 1/2003 | Naruke |

FOREIGN PATENT DOCUMENTS

| JP | 49-44115 | 4/1974 |
| JP | 56-8834 | 7/1979 |
| JP | 03-213613 | 9/1991 |
| JP | 09-041945 | 2/1997 |

* cited by examiner

Primary Examiner—Duane S. Smith
(74) Attorney, Agent, or Firm—Todd Deveau; Thomas, Kayden Horstemeyer & Risley LLP

(57) ABSTRACT

The present invention is an exhaust gas purifier that can effectively remove soot from exhaust gas of a diesel automobile, for example, a truck and a bus. The present invention has a simple structure, and can effectively remove from exhaust gas the following exemplary pollutants, carbon monoxide, nitrogen oxides, sulfur oxides and hydrocarbons.

10 Claims, 13 Drawing Sheets

EXHAUST GAS CLEANER

CROSS-REFERENCE TO RELATED APPLICATIONS AND CLAIM OF PRIORITY

This is a U.S. National Phase application of PCT/JP00/06490 filed on Sep. 22, 2000, which PCT application claims priority on JP application number 11-270885, filed Sep. 24, 1999 and JP application number 2000-200799, filed Jul. 3, 2000.

TECHNICAL FIELD

The present invention relates to an exhaust gas purifier, and in particular, to an exhaust gas purifier which can effectively remove soot contained in the exhaust gas of a diesel engine or the like.

BACKGROUND TECHNOLOGY

In large cities and the areas beside principal roads and the like, air pollution caused by exhaust gas of automobiles has become serious in recent years.

In gasoline automobiles, exhaust gas regulations have become stricter in these past several decades, and methods for cleaning exhaust gases such as controlling combustion at the engine, oxidation/reduction of harmful components in the exhaust gas by oxidation-reduction catalysts, three-way processing catalysts or others have come to be generally adopted. However, hydrocarbons and carbon monoxide in the exhaust gas cannot be completely removed by any of the aforementioned means.

Further, with regard to diesel automobiles as well, various types of means such as combustion control at the engine, increasing of the boost pressure, hybridizing with a motor, and the like have been studied as exhaust gas purifying means.

However, these exhaust gas purifying means are not satisfactory with regard to the point of their ability to remove the soot and smoke and the like in exhaust gasses, and there is also the problem that the structure of the engine becomes complex.

Here, various types of exhaust gas purifiers, which remove hydrocarbons contained in the exhaust gas of an engine, have been proposed.

As such an exhaust gas purifier, for example, in Japanese Patent Application Laid-Open (JP-A) No. 51-113023, there is proposed an exhaust purifier of an internal combustion engine (see page 1, lower left column, lines 5-13 of JP-A No. 51-113023) in which a. an absorption device for absorbing hydrocarbons is provided in the exhaust path of the engine, b. a liquid adsorbent is provided so as to be made to flow down within the absorption device, c. a conduit, which guides the liquid absorbent which has absorbed hydrocarbons to a hydrocarbon desorbing device, is provided in the absorption device, d. the exhaust heat of the engine heats the hydrocarbon desorbing device, and the output side communicates with the intake side of the engine.

Further, in JP-A 61-072615, a waste gas purifier of an internal combustion engine, in which a tank containing a purifying liquid is connected to a waste gas pipe from the internal combustion engine, is disclosed (JP-A No. 61-072615, page 1, lower left column, lines 5-7). As the purifying liquid, water, a lean mixed solution of an organic acid, and a wood vinegar are disclosed (JP-A No. 61-072615, page 1, lower left column, line 8 through the same page, lower right column, line 14).

Moreover, in JP-A No. 07-224638, there is disclosed an exhaust gas purifier consisting of a container which contains an aqueous solution removing simultaneously nitrogen oxides, sulfur oxides, dust, and the like in the exhaust gas, and an air diffusing pipe which is inserted into the container (the claims of JP-A No. 07-224638).

However, the object of the exhaust purifier disclosed in JP-A No. 51-113023 is to remove volatile hydrocarbons from the exhaust gas, and the removal of soot is not an object.

Further, in the exhaust gas purifiers disclosed in JP-A No. 61-072615 and JP-A No. 07-224638, as described above, a water based purifying liquid, such as water, wood vinegar, an aqueous solution which removes nitrogen oxides or the like in the exhaust gas, or the like, is used. However, the viscosity of these purifying liquids is as low as that of water. Additionally diesel engines having a large cubic capacity, such as engines of trucks or busses or the like, have a high exhaust gas pressure of 5 to 6 atm.

Accordingly, when introducing the exhaust gas of the diesel engine into the exhaust gas purifier, there are the problems that the purifying liquid scatters due to the pressure of the exhaust gas, and the soot and smoke in the exhaust gas adsorbed in the purifying liquid returns again into the exhaust gas together with the purifying liquid.

Further, because the temperature of the exhaust gas of the diesel engine reaches 300 to 500° C., a problem arises that, when the exhaust gas of the diesel engine is introduced into the exhaust gas purifier, the purifying liquid in a tank or a container thereof is heated by the exhaust gas and evaporated.

The object of the present invention is to provide an exhaust gas purifier which can effectively remove soot and smoke from exhaust gas of a diesel automobile such as a truck or a bus or the like, and whose structure is simple, and to provide an exhaust gas purifier which can effectively remove, from the exhaust gas, carbon monoxide, nitrogen oxides, sulfur oxides, and the like, in addition to hydrocarbons.

SUMMARY OF THE INVENTION

A first aspect of the present invention relates to an exhaust gas pruifier comprising: an exhaust gas purifying tank accommodating, at an interior, an exhaust gas purifying liquid selected from lubricating oils and animal and vegetable oils; an exhaust gas introducing flow path provided at a bottom portion of the exhaust gas purifying tank, and introducing exhaust gas which is to be purified into the exhaust gas purifying liquid accommodated in the exhaust gas purifying tank; and an exhaust gas guide-out flow path which guides exhaust gas, which has flowed through the exhaust gas purifying liquid, out to an exterior of the exhaust gas purifying tank, wherein a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at the exhaust gas guide-out flow path.

A second aspect of the present invention relates to an exhaust gas purifier comprising: a first exhaust gas purifying tank accommodating, at an interior, an exhaust gas purifying liquid selected from lubricating oils and animal and vegetable oils; a second exhaust gas purifying tank accommodating, at an interior, a nitrogen oxide removing liquid which has affinity with respect to nitrogen oxides and sulfur oxides; a first exhaust gas introducing flow path provided at a bottom portion of the first exhaust gas purifying tank, and introducing exhaust gas which is to be purified into the exhaust gas purifying liquid accommodated in the first exhaust gas purifying tank; a second exhaust gas introducing flow path provided at a bottom portion of the second exhaust gas purifying tank, and introducing exhaust gas, which has been guided-out from the first exhaust gas purifying tank, into the nitrogen oxide removing liquid accommodated in the second exhaust gas purifying tank; and an exhaust gas guide-out flow path which guides exhaust gas, which has been introduced into the exhaust gas purifying liquid, out to an exterior of the second exhaust gas purifying tank, wherein a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided a both of the second exhaust gas introducing flow path and the exhaust gas guide-out flow path.

A third aspect of the present invention relates to, in the exhaust gas purifier relating to the above-described second aspect, an exhaust gas purifier in which the nitrogen oxide removing liquid is water.

A fourth aspect of the present invention relates to an exhaust gas purifier having an exhaust gas purifying tank accommodating, at an interior, an exhaust gas purifying liquid selected from lubricating oils and animal and vegetable oils; an exhaust gas introducing means provided within the exhaust gas purifying tank, and introducing exhaust gas into the exhaust gas purifying liquid accommodated in the exhaust gas purifying tank; and an exhaust gas guide-out flow path which guides out exhaust gas which has flowed through the exhaust gas purifying liquid, wherein the exhaust gas introducing means is equipped with: an exhaust gas jetting portion which jets exhaust gas in a given direction; and an exhaust gas flow guiding duct which extends along a direction of jetting exhaust gas at the exhaust gas jetting portion, and a purifying liquid return opening, through which the exhaust gas purifying liquid flows in, is provided at one end of the exhaust gas flow guiding duct, and an opening portion, through which exhaust gas purifying liquid which has flowed through an interior flows out, is provided at another end of the exhaust gas flow guiding duct, and the exhaust gas jetting portion is accommodated in a vicinity of the purifying liquid return opening, and a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at the exhaust gas guide-out flow path.

A fifth aspect of the present invention relates to an exhaust gas purifier having an exhaust gas purifying tank accommodating, at an interior, an exhaust gas purifying liquid selected from lubricating oils and animal and vegetable oils; an exhaust gas introducing means provided within the exhaust gas purifying tank, and introducing exhaust gas into the exhaust gas purifying liquid accommodated in the exhaust gas purifying tank; and an exhaust gas guide-out flow path which guides out exhaust gas which has flowed through the exhaust gas purifying liquid, wherein the exhaust gas introducing means is equipped with: an exhaust gas jetting portion which jets exhaust gas in a given direction; and an exhaust gas flow guiding duct which extends along a direction of jetting exhaust gas at the exhaust gas jetting portion, and a purifying liquid return opening, through which the exhaust gas purifying liquid flows in, is provided at one end of the exhaust gas flow guiding duct, and an opening portion, through which exhaust gas purifying liquid which has flowed through an interior flows out, is provided at another end of the exhaust gas flow guiding duct, and the exhaust gas jetting portion is accommodated in a vicinity of the purifying liquid return opening, and an exhaust gas purifying liquid agitating portion, which is equipped with an agitating sphere accommodating chamber, which is formed such that exhaust gas can flow therethrough, and agitating spheres, which are accommodated floatably at an interior of the agitating sphere accommodating chamber, and which agitates exhaust gas purifying liquid flowing out from an interior of the exhaust gas flow guiding duct, is provided in the vicinity of the opening portion provided at the other end of the exhaust gas flow guiding duct.

A sixth aspect of the present invention relates to, in the exhaust gas purifier relating to the above-described fifth aspect, an exhaust gas purifier in which a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at the exhaust gas guide-out flow path.

A seventh aspect of the present invention relates to, in the exhaust gas purifier relating to any one of the above-described fourth through sixth aspects, an exhaust gas purifier in which the exhaust gas jetting portion is formed so as to jet the exhaust gas upwardly and obliquely upwardly.

An eighth aspect of the present invention relates to, in the exhaust gas purifier relating to any one of the above-described fifth through seventh aspects, an exhaust gas purifier in which the agitating sphere accommodating chamber is a agitating sphere rotating container which is formed so as to be able to rotate around an axis which extends in a horizontal direction.

A ninth aspect of the present invention relates to, in the exhaust gas purifier relating to any one of the first through eighth aspects, an exhaust gas purifier in which the exhaust gas purifying liquid is a lubricating oil.

A tenth aspect of the present invention relates to, in the exhaust gas purifier relating to the ninth aspect, an exhaust gas purifier in which the lubricating oil has a viscosity of 5 to 2,000 cSt.

An eleventh aspect of the present invention relates to an exhaust gas purifier in which the exhaust gas purifying liquid agitating portion is equipped with an agitating sphere accommodating chamber which is formed such that exhaust gas can flow through it, and agitating spheres which are accommodated therein so as to be able to move at an interior of the agitating sphere accommodating chamber.

A twelfth aspect of the present invention relates to an exhaust gas purifier in which the agitating sphere accommodating chamber is a rotating container formed so as to rotate around an axis which extends in a horizontal direction.

Figure 1:
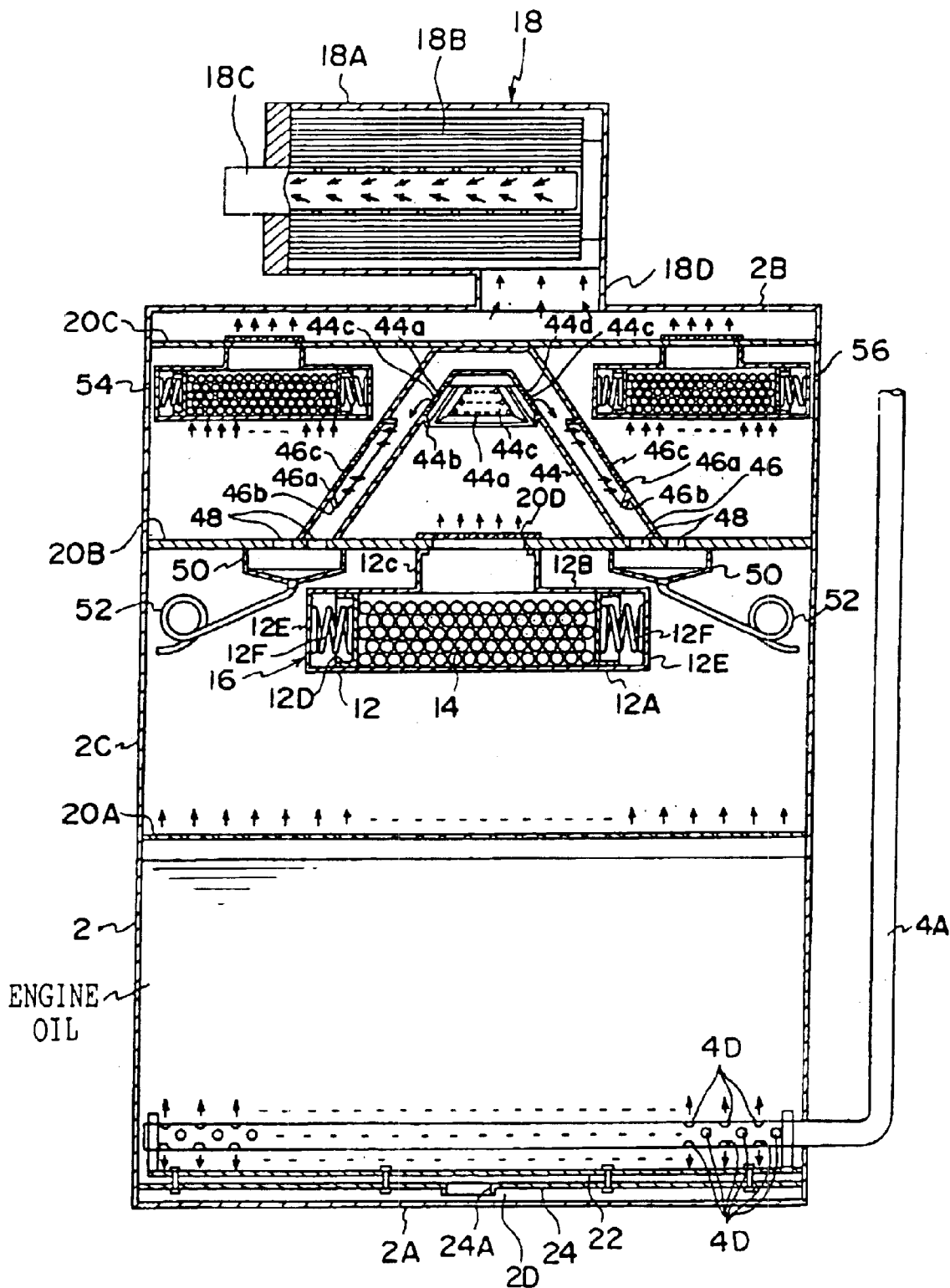
FIG. 1 is a longitudinal sectional view showing an example of an exhaust gas purifier relating to a first embodying aspect of the present invention.

2 exhaust gas purifier
4 exhaust gas jetting portion
4A exhaust gas-introducing pipe
6 exhaust gas flow guiding duct
8 agitating sphere accommodating chamber
8A agitating sphere room
80 rotating container for agitating spheres
82 end plate
84 donut-shaped plate
86 donut-shaped plate holding member
10 agitating sphere
12 floating sphere accommodating chamber
14 floating sphere
16 floating sphere filter
18 exhaust gas cleaner
44 first mist-catching hood
46 second mist-catching hood
60 nitrogen oxide removing tank
70 nitrogen oxide removing tank

BEST MODES FOR IMPLEMENTING THE INVENTION

1. Embodiments
(1) Embodiment 1

An example of an exhaust gas-processing device relating to a first embodying aspect of the present invention is shown in FIG. 1. The exhaust gas-processing device shown in FIG. 1 is suitably used in a large-sized diesel automobile such as a truck or a bus or the like.

As shown in FIG. 1, the exhaust gas purifier relating to the first embodiment is equipped with an exhaust gas purifying tank 2 in which engine oil serving as an exhaust gas purifying liquid is stored at the interior, an exhaust gas-introducing pipe 4A which introduces the exhaust gas of a diesel engine or the like into the engine oil, and an exhaust gas cleaner 18 which forms a portion of an exhaust gas guide-out flow path which guides the exhaust has, which has been purified in the exhaust gas purifying tank 2, out to the outside.

In the exhaust gas purifier of embodiment 1, the exhaust gas purifying tank 2 has a vertically-long, rectangular-parallelepiped shape, and is equipped with a bottom plate 2A and a ceiling plate 2B which is parallel to the bottom plate 2A. Note that the exhaust gas purifying tank 2 may have a cylindrical shape or the like.

As shown in FIG. 1, at the interior of the exhaust gas purifying tank 2, a splash-returning plate 20A, which is formed from a punch metal plate and in which a large number of circular holes are formed in the entire surface thereof, is provided parallel to the bottom plate 2A, and above the splash-returning plate 20A, a middle plate 20B is provided parallel to the splash-returning plate 20A. The hole diameter of the circular holes in the splash-returning plate 20A is preferably about 3 mm. Accordingly, the interior of the exhaust gas purifying tank 2 is divided into three sections at the top, middle, and bottom by the splash-returning plate 20A and the middle plate 20B.

The exhaust gas purifying liquid such as engine oil or the like is stored in the lowermost stage in the interior of the exhaust gas purifying tank 2, i.e., in the section which is sandwiched between the bottom plate 2A and the splash-returning plate 20A.

As shown in FIG. 1, the exhaust gas-introducing pipe 4A passes through a side wall 2C of the exhaust gas purifying tank 2 in the vicinity of the bottom plate 2A, and extends along the bottom plate 2A. A large number of exhaust gas jetting openings 4D, which introduce exhaust gas, are provided in the exhaust gas-introducing pipe 4A along the entire length thereof at the portion thereof which is positioned at the interior of the exhaust gas purifying tank 2.

As shown in FIG. 1, a lower plate 22, which keeps the jet of exhaust gas from the exhaust gas jetting openings 4D from directly hitting the bottom plate 2A, is provided in a horizontal direction between the exhaust gas-introducing pipe 4A and the bottom plate 2A in the exhaust gas purifying tank 2. An exhaust mud separating plate 24 is provided horizontally between the lower plate 22 and the bottom plate 2A. A purifying liquid pool 2D, which holds the engine oil which is dirtied by the soot and smoke included in the exhaust gas from the exhaust gas-introducing pipe 4A, is formed between the exhaust gas mud separating plate 24 and the bottom plate 2A. An opening portion 24A is provided in the central portion of the exhaust mud separating plate 24.

A gap of about 10 mm is formed between the outer periphery of the lower plate 22 and the inner wall surface of the exhaust gas purifying tank 2. Thus, a flow path of engine oil, which reaches the purifying liquid pool 2D from the portion of the exhaust gas purifying tank 2 at which soot and the like in the exhaust gas are adsorbed, is formed by the lower plate 22 and the exhaust mud separating plate 24. A drain valve (not shown), which discharges the exhaust gas purifying liquid which are held in the purifying liquid pool 2D, is provided at the bottom plate 2A.

The exhaust gas purifying liquid that is accommodated in the exhaust gas purifying tank 2 is selected from lubricating oils and animal and vegetable oils.

The exhaust gas purifying liquid is preferably substantially non-volatile at room temperature. Here, examples of liquids which are substantially non-volatile at room temperature are liquids whose vapor pressure at room temperature (25° C.) is about 10 mmHg or less, and preferably 5 mmHg or less, and particularly preferably 1 mmHg or less.

Examples of lubricating oils are various types of lubricating oils encompassing, in addition to engine oil, gear oil, machine oil, turbine oil, bearing oil, hydraulic operating oil, machine tool oil, vacuum pump oil, compressor oil and the like. Other than petroleum based lubricating oils, a synthetic lubricating oil or the like, such as ester based synthetic lubricating oils or ether based synthetic lubricating oils or the like, may also be used as the various types of lubricating oil. The viscosity of the lubricating oils is preferably, for example, at 37.8° C. (100° Fahrenheit), 5 to 2,000 cSt, and particularly preferably 10 to 1,500 cSt at the above temperature, and particularly preferably 100 to 1,500 cSt.

Examples of animal and vegetable oils include vegetable oils such as rapeseed oil, soybean oil, cottonseed oil, sunflower oil, rice bran oil, peanuts oil, castor oil, and the like, and animal fats and oils such as lard, head, whale oil, fish oil, hydrogenated fish oil, and the like. Food waste oils and the like which are discarded from restaurants and food factories and the like, are also included in the animal and vegetable oils.

Lubricating oils are preferable as the exhaust gas purifying liquid, from the standpoints of their particularly close affinity toward the hydrocarbons such as soot in an exhaust, of their low cost, and of being able to be reused as fuel after deterioration.

Other examples of the exhaust gas purifying liquid are a mixture in which an amine, such as an aliphatic amine having a number of carbons of about 3 to 15 or an aromatic amine having a number of carbons of about 6 to 12 or the like, is dissolved in one or more liquids selected from the group consisting of lubricating oils and animal and vegetable oils. It is thought that this mixture can remove even nitrogen oxides and sulfur oxides in addition to hydrocarbons such as soot and the like.

As shown in FIG. 1, a floating sphere filter 16 is provided above the splash-returning plate 20A at the interior of the exhaust gas purifying tank 2.

Figure 2:
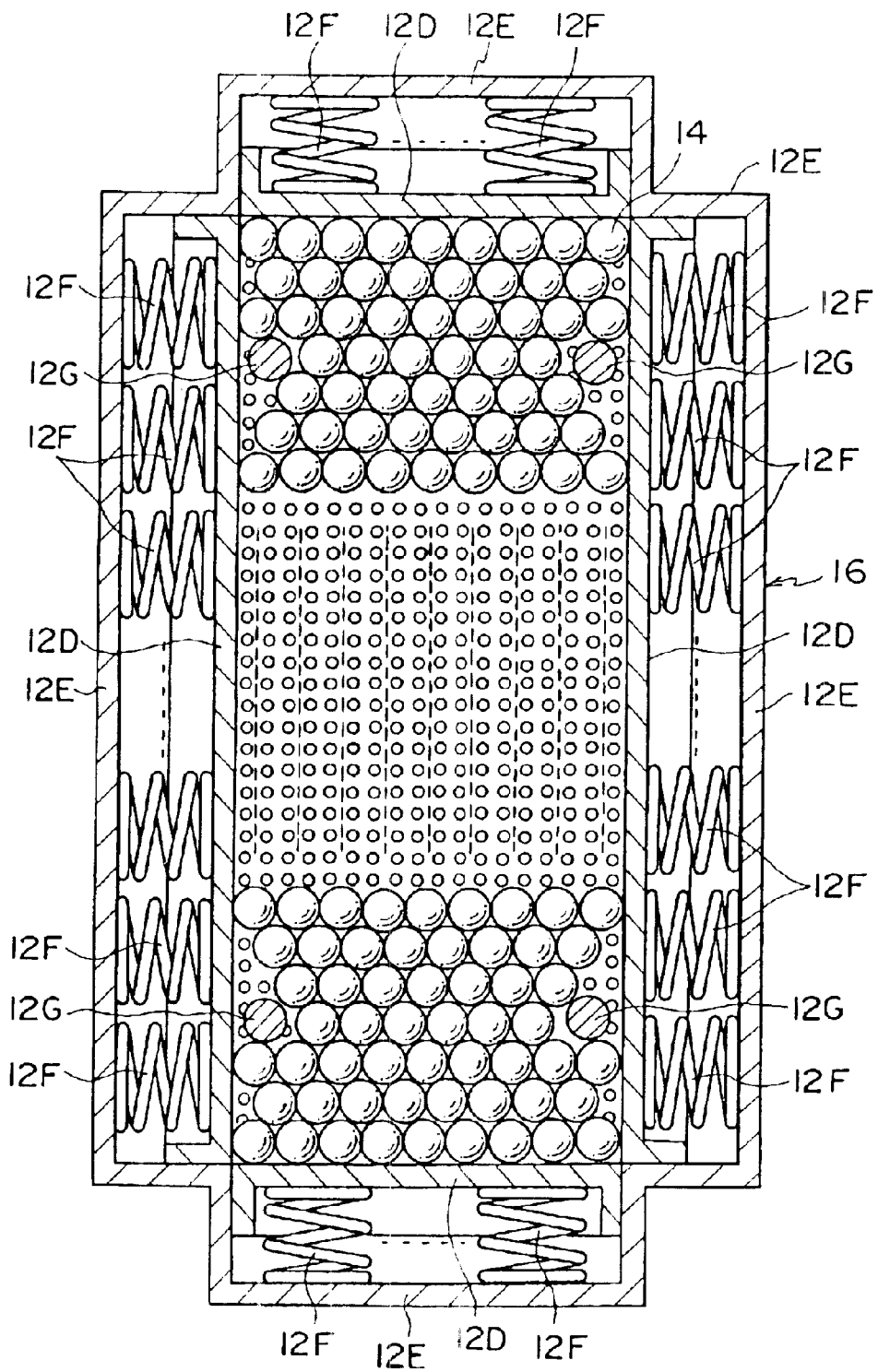
FIG. 2 is a sectional view showing an internal structure of a floating sphere filter with which the exhaust gas purifier shown in FIG. 1 is equipped.

Details of the structure of the floating sphere filter 16 are shown in FIG. 2.

As shown in FIG. 2, the floating sphere filter 16 has a floating sphere accommodating chamber 12, which is shaped as a flat substantially rectangular parallelepiped which can expand and contract in directions, namely, the horizontal directions, orthogonal to the exhaust gas guide-out direction, and floating spheres 14 which are a group of spheres which are accommodated in the floating sphere accommodating chamber 12.

A bottom plate 12A of the floating sphere accommodating chamber 12 is formed from a punch metal plate. A ceiling plate 12B has, in a central portion thereof, an exhaust gas guide-out duct 12C that guides the exhaust gas out. The exhaust gas guide-out duct 12C opens at the middle plate 20B, and a punch metal plate 20D covers this opening.

The floating sphere accommodating chamber 12 is fixed to the bottom surface of the middle plate 20B by four mounting bolts 12G.

Pairs of floating walls 12D, which are positioned on opposite sides so as to sandwich the floating spheres 14, are provided within the floating sphere accommodating chamber 12. The floating walls 12D are formed so as to be slidable in the horizontal directions at the interior of the floating sphere accommodating chamber 12, and are thrust in the directions toward the floating spheres 14, i.e., in directions toward the central portion of the floating sphere accommodating chamber 12, by springs 12F which are interposed between the floating walls 12D and side walls 12E of the floating sphere accommodating chamber 12. The surface of the floating wall 12D at the side facing the floating spheres 14 is formed vertically.

The floating walls 12D can be formed so as to move reciprocally in left and right directions in FIG. 1 by a driving motor such as an electric motor or a hydraulic motor or the like. Or, the floating walls 12D may be formed so as to move reciprocally due to the rotation of the internal combustion engine, such as the diesel engine or the like, which is the source of the discharge.

The number of floating spheres 14 is not particularly limited, provided that it is of an extent that the floating spheres 14 can move reciprocally in the interior of the floating sphere accommodating chamber 12.

Steel balls, such as pachinko balls, ball bearing spheres, and the like, and other metal spheres, and the like, can be used as the floating spheres 14 provided that the spheres have a high sphericity and have a weight of a certain level or more. Examples of metal spheres are stainless steel spheres, gun metal spheres, bronze spheres, aluminum bronze spheres, phosphor bronze spheres, beryllium bronze spheres, cupronickel spheres, and the like.

Other examples of the floating spheres 14 are soft-material-covered spheres in which the surface of the above metal sphere is covered by a soft material such as rubber, a thermoplastic elastomer, or a soft resin, e.g., soft vinyl chloride resin or the like, and ceramic spheres and the like.

Here, the exhaust gas purifier shown in FIG. 1 is usually used in a state of being loaded in a large-sized automobile such as a truck or the like. Thus, during use thereof, the exhaust gas purifier always receives vibrations from the road surface.

Accordingly, the exhaust gas purifying tank 2 also receives horizontal direction acceleration. Further, the floating sphere filter 16 and the floating spheres 14 accommodated in the floating sphere filter 16 also receive horizontal direction acceleration. The floating spheres 14 which receive the horizontal direction acceleration push the floating wall 12D, which is at the side to which the acceleration is applied, toward the side wall 12E at the facing side which, together with that floating wall 12D, sandwiches the springs 12F. In this way, these springs 12F contract in the direction of the acceleration. Thus, due to the thrusting force from these springs 12F, that floating wall 12D moves toward the central portion of the floating sphere accommodating chamber 12, and the floating spheres 14 as well are pushed by this floating wall 12D and return to the central portion of the floating sphere accommodating chamber 12.

Even after the floating spheres 14 have returned to the central portion of the floating sphere accommodating chamber 12, the floating spheres 14 move, due to inertia, in the direction opposite to the direction of the acceleration, and push the floating wall 12D at the side opposite to the floating wall 12D which was pushed previously. The floating wall 12D which is pushed by the floating spheres 14 moves toward the central portion of the floating sphere accommodating chamber 12 due to the thrusting force from the spring 12F. Thus, the floating spheres 14 as well are pushed by the floating wall 12D and return to the central portion of the floating sphere accommodating chamber 12.

In this way, because the floating spheres 14 move in the interior of the floating sphere filter 16, even if engine oil adheres to the surfaces of the floating spheres 14, the floating spheres 14 do not stick together into one clump. Then, when the engine oil accumulates on the surfaces of the floating spheres 14 so much, the engine oil drips down from the surfaces and returns to the exhaust gas purifying tank 2 through the holes in the bottom plate 12A of the floating sphere accommodating chamber 12.

As shown in FIG. 1, a pyramid-shaped first mist-catching hood 44 is provided at the upper surface of the middle plate 20B, so as to cover the opening portion of the exhaust gas guide-out duct 12C. First exhaust gas outlets 44a, which are outlets for the exhaust gas, are provided in the vicinity of the peak portion at the inclined surfaces of the first mist-catching hood 44, and at the periphery, splash return ribs 44b, which are rib-shaped, are provided so as to be directed toward the interior of the first mist-catching hood 44. Punch metal plates 44c are fit into the first exhaust gas outlets 44a.

The first mist-catching hood 44 is covered over by a second mist catching hood 46 formed in a pyramid shape which is substantially similar to the shape of the first mist-catching hood 44. In the portion close to the bottom of the inclined surfaces of the mist-catching hood 46, second exhaust gas outlets are provided. As well as the first mist-catching hood 44, the second mist-catching hood 46 has splash return ribs 46b provided inwardly around the exhaust gas outlets 46A. Further, punch metal plates 46c are fit into the second exhaust gas outlets 46a as well as the first exhaust gas outlets 44a.

As shown by the arrows in FIG. 1, when the exhaust gas, which flows into the first mist-catching hood 44, flows out from the first exhaust gas outlets 44a, the exhaust gas flows downward along the inner wall surfaces of the second mist-catching hood 46, and flows out to the exterior from the second exhaust gas outlets 46a. In this way, the first mist-catching hood and the second mist-catching hood 46 function to bend the flow of the exhaust gas which has flowed out from the floating sphere filter 16.

The floating sphere filter 16, the first mist-catching hood 44, and the second mist-catching hood 46 correspond to the purifying liquid discharge preventing means in the exhaust gas purifier of the present invention. The first mist-catching hood 44 and the second mist-catching hood 46 correspond to the exhaust gas flow bending means in the exhaust gas purifier of the present invention.

As shown in FIG. 1, purifying liquid removing holes 48, which remove the exhaust gas purifying liquid which gathers at the upper surface of the middle plate 20B, are opened in a portion of the middle plate 20B between the outer wall surface of the first mist-catching hood 44 and the inner wall surface of the second mist-catching hood 46, and in the vicinity of the outer wall surface of the second mist-catching hood 46. Funnel-shaped purifying liquid ports 50, which gather the exhaust gas purifying liquid through the purifying liquid removing holes 48, are provided at the portion of the bottom surface of the middle plate 20B at which the purifying liquid removing holes 48 are open. A purifying liquid return conduit 52, which returns the exhaust gas purifying liquid pooled in the purifying liquid port 50 to the region between the middle plate 20B and the splash-returning plate 20A in the exhaust gas purifying tank 2, is provided at a portion corresponding to the leg of the funnel of the purifying liquid port 50. As shown in FIG. 1, the distal end of the purifying liquid return conduit 52 is formed in a loop-shape.

As shown in FIG. 1, in the vicinity of the ceiling plate 2B of the exhaust gas purifying tank 2, an upper plate 20C, which holds the second mist-catching hood 46 at its peak, is provided parallel to the ceiling plate 2B. Floating sphere filters 54 and 56, which have structures similar to that of the above-described floating sphere filter 16, are provided at the lower surface of the upper plate 20C such that the second mist-catching hood 46 is located therebetween.

As shown in FIG. 1, the exhaust gas cleaner 18, which is cylindrical and extends in the horizontal direction, is provided above the ceiling plate 2B.

The exhaust gas cleaner 18 has a substantially cylindrical exhaust gas cleaner main body 18A which is provided in the horizontal direction, an exhaust gas filter 18B which is accommodated in the interior of the exhaust gas cleaner main body 18A, an exhaust gas pipe 18C which discharges to the exterior the exhaust gas which has passed through the exhaust gas filter 18B, and an exhaust gas-introducing pipe 18D which leads the exhaust gas, which has passed through the floating filter 16, to the exhaust gas cleaner main body 18A.

Hereinafter, the operation of the exhaust gas purifier of embodiment 1 will be described. The arrows in FIG. 1 show the flow of the exhaust gas in the exhaust gas purifier of the first embodiment.

The exhaust gas, which has been discharged from the diesel engine of a truck or a bus or the like and which has passed through a muffler, passes through the exhaust gas-introducing pipe 4A, and is introduced into the exhaust gas purifying tank 2 from the exhaust has jetting openings 4D.

Mainly soot is removed from this exhaust gas by the exhaust gas purifying liquid such as engine oil or the like which is held in the interior of the exhaust gas purifying tank 2. At this exhaust gas purifying liquid, uncombusted fuel and the like are also removed.

The exhaust gas which has flowed through the exhaust gas purifying liquid passes through the small holes provided in the splash-returning plate 20A, and flows into the floating sphere filter 16. Because the exhaust pressure of the diesel engine is usually around 5 to 6 atm, a portion of the engine oil not only scatters in a mist form, but also scatters in drop shapes due to the pressure of the exhaust gas introduced from the exhaust gas-introducing pipe 4A. Accordingly, not only the exhaust gas that has passed through the engine oil, but also the mist-form and drop-shaped engine oil is discharged from the exhaust gas purifying tank 2. Most of the drop-shaped engine oil, which has been discharged concomitantly with the exhaust gas, hits the splash-returning plate 20A and is returned to the exhaust gas purifying tank 2, and one portion thereof enters into the floating sphere filter 16 concomitantly with the exhaust gas.

Within the floating sphere filter 16, the exhaust gas flows through between the floating spheres 14. On the other hand, the majority of the mist-form or drop-shaped engine oil, which has entered into the floating sphere filter 16 concomitantly with the exhaust gas, adheres to the surfaces of the floating spheres 14, becomes oil drops, drops down toward the splash-returning plate 20A, and returns to the interior of the exhaust gas purifying tank 2.

As described above, because the floating spheres 14 flow within the floating sphere filter 16, they do not adhere to one another and form one clump due to the engine oil adhering to the surfaces thereof. Further, the surfaces of the floating spheres 14 are always in a cleaned state due to the engine oil which flies into the floating sphere filter 16. Accordingly, because soot do not accumulate on the surfaces of the floating spheres 14, the floating sphere filter 16 does not become clogged do to soot and smoke and the like in the exhaust gas.

As shown by the arrows in FIG. 1, the exhaust gas which flows out of the floating sphere filter 16 flows into the inner side of the first mist-catching hood 44, passes through the first exhaust gas outlets 44a, and flows out into the space between the first mist-catching hood 44 and the second mist-catching hood 46. The portion of the engine oil which has not been removed by the floating sphere filter 16 is obstructed by the splash return ribs 44b provided at the peripheries of the first exhaust gas outlets 44a, and flows down along the inner wall surfaces of the first mist-catching hood 44.

The exhaust gas, which flows out into the aforementioned section from the first exhaust gas outlets 44a, flows down along the inner wall surfaces of the second mist-catching hood 46, and flows out to the exterior of the second mist-catching hood 46 from the second exhaust gas outlets 46a. On the other hand, the mist-form engine oil and soot and the like which remain in the exhaust gas proceed directly toward the inner wall surfaces of the second mist-catching hood 46 from the first exhaust gas outlets 44a, and adhere to the inner wall surfaces of the second mist-catching hood 46. In this way, at least a portion of the engine oil and the soot and smoke in the exhaust gas is removed from the exhaust gas.

At least a portion of the mist-form engine oil and soot, which still remain in the exhaust gas which flows along the inner wall surfaces of the second mist-catching hood 46, is obstructed by the splash return ribs 46b formed at the peripheries of the second exhaust gas outlets 46a.

The exhaust gas, which flows out to the exterior of the second mist-catching hood 46, is discharged to the exterior through the floating sphere filters 54 and 56 which are mounted to the upper plate 20C, and the exhaust gas cleaner 18.

In accordance with the exhaust gas purifier of embodiment 1, harmful components, such as soot and hydrocarbons and the like, which are discharged from the diesel engine of a truck, a bus, construction machinery, or the like, are extremely effectively removed.

In addition, when the diesel engine runs in a state in which the exhaust gas purifier of the first embodiment is connected to the exhaust pipe of the diesel engine, the exhaust noise from the diesel engine can hardly be heard, and only machine noises, such as the noise of gears meshing together or the like, can be heard. Thus, the running noise of the diesel engine is extremely low.

Moreover, because engine oil is usually flammable, the engine oil which has been saturated by the harmful components in the exhaust gas can be effectively used as fuel. Accordingly, the problem of industrial wastes arising does not occur.

Further, the exhaust gas purifier of embodiment 1 can be used as well in a fixed type diesel engine such as a diesel engine for power generator or the like, in a large-sized diesel engine such as a diesel engine for a boat or the like, and in a gasoline engine for a passenger vehicle or the like.

(2) Embodiment 2

Figure 3:
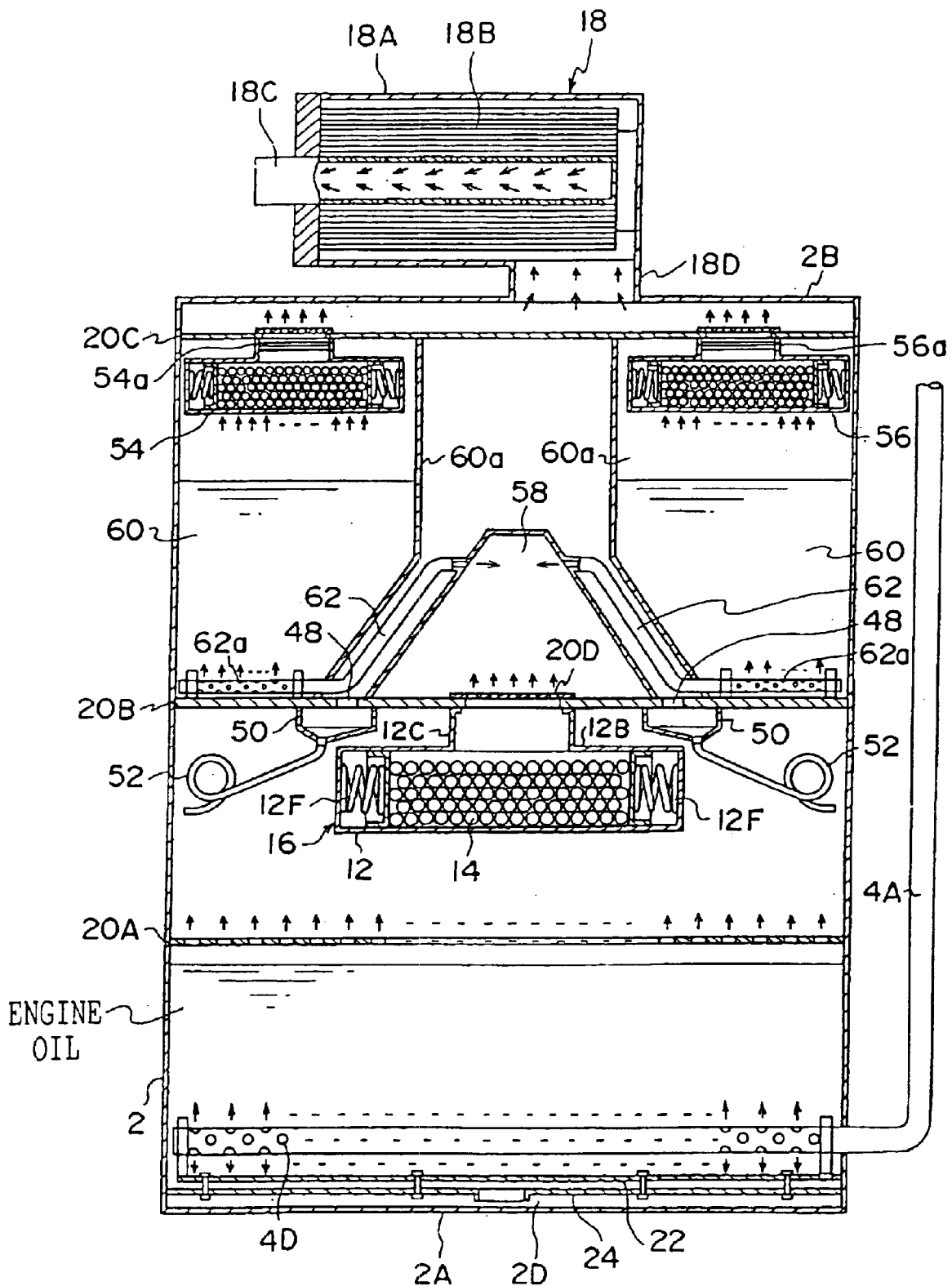
FIG. 3 is a longitudinal sectional view showing an example of an exhaust gas purifier relating to a second embodying aspect of the present invention.

An example of an exhaust gas purifier relating to a second embodying aspect of the present invention is shown in FIG. 3.

In FIG. 3, reference numerals which are the same as those of FIG. 1 and FIG. 2 denote the same structural elements as the structural elements denoted by those reference numerals in FIG. 1 and FIG. 2 unless otherwise noted.

As shown in FIG. 3, in the exhaust gas purifier of example 2 as well, the interior of the exhaust gas purifying tank 2 is sectioned into three parts in the vertical direction by the splash-returning returning plate 20A and the middle plate 20B, in the same way as the exhaust gas purifying tank 2 in the exhaust gas purifier of the first embodiment. The exhaust gas purifying liquid such as engine oil or the like is stored in the section of the bottommost level among the three sections in the interior of the exhaust gas purifying tank 2. The portion of the exhaust gas purifying tank 2 in which the exhaust gas purifying liquid is stored corresponds to the first exhaust gas purifying tank in the purifier of exhaust gas relating to the second embodying aspect.

The floating sphere filter 16 is provided at the bottom surface of the middle plate 20B.

A exhaust gas hood 58, which has a pyramid shape and into which the exhaust gas which has passed through the floating sphere filter 16 is introduced, is provided at the top surface of the middle plate 20B. Further, a pair of nitrogen oxide removing tanks 60 are formed such that the exhaust gas hood 58 is located therebetween. The nitrogen oxide removing tank 60 corresponds to the second exhaust gas purifying tank in the exhaust gas purifier relating to the second embodying aspect. Water is accommodated in the nitrogen oxide removing tanks 60.

Various types of nitrogen oxide removing liquids, including water, can be accommodated in the nitrogen oxide removing tanks 60. The nitrogen oxide removing liquid is a liquid which removes, from the exhaust gas, harmful components having polarity such as nitrogen oxides and sulfur oxides in the exhaust gas, and is selected from liquids which have affinity to nitrogen oxides and sulfur oxides. Examples of the liquid are, in addition to water, alkaline aqueous solutions, organic bases, and the like.

Examples of the alkaline aqueous solutions are sodium hydroxide aqueous solution, potassium hydroxide aqueous solution, lithium hydroxide aqueous solution, lime water, sodium bicarbonate water, sodium carbonate aqueous solution, and the like.

Examples of the organic base are aliphatic amines having a carbon number of about 5 to 25 such as propyl amine, diisopropyl amine, dibutyl amine, tributyl amine, pentyl amine, dipentyl amine, tripentyl amine, hexyl amine, dihexyl amine, trihexyl amine, heptyl amine, octyl amine, dioctyl amine, nonyl amine, dinonyl amine, decyl amine, cyclohexyl amine; aromatic amines having a carbon number of about 6 to 12 such as aniline, N-methyl aniline, N,N-dimethyl aninline, N,N-diethyl aniline, toluidine, and the like; heterocyclic organic base compounds such as pyridine, picoline, quinoline, isoquinoline, pyrimidine; alkanol amines such as ethanol amine; and the like.

Among the nitrogen oxide removing liquids, water is most preferable from the standpoints that it is inexpensive and safe as well.

A pair of exhaust gas-introducing pipes 62 is connected at one of the ends toward the portion of the exhaust gas hood 58 close to the top end thereof. The exhaust gas-introducing pipes 62 introduce the exhaust gas from the exhaust gas hood 58 to the nitrogen oxide-removing tank 60. Another end portions of the exhaust gas-introducing pipes 62 pass through side walls 60a of the nitrogen oxide removing tanks 60 in the vicinity of the middle plate 20B, and, in the interiors of the nitrogen oxide removing tanks 60, extend along the upper surface of the middle plate 20B. A large number of exhaust gas introducing holes 62a, which introduce exhaust gas from the exhaust gas hood 58 into the water accommodated in the interiors of the nitrogen oxide removing tanks 60, are provided along the longitudinal direction on the exhaust gas-introducing pipes 62.

As shown in FIG. 3, the lower surface of the upper plate 20C forms the ceiling surfaces of the nitrogen oxide removing tanks 60.

The floating sphere filters 54 and 56 are provided on the ceiling surfaces of the nitrogen oxide removing tanks 60.

The floating sphere filters 54 and 56 have substantially similar structures as the floating sphere filter 16, except for the point that, instead of the floating spheres 14, gun metal spheres are accommodated, and except for the point that, as shown in FIG. 3, a gun metal filter 54a and a gun metal filter 56a, which are respectively sheet-shaped and formed by working thin wires of gun metal into a felt shape, are provided in the vicinity of the openings of the floating sphere filters 54 and 56. The gunmetal filters 54a and 56a can also be called scrubbing brush filters. Other than gun metal spheres, highly anti-corrosive alloy spheres such as aluminum bronze spheres, phosphor bronze spheres, beryllium bronze spheres, cupronickel spheres, stainless steel spheres, and the like, are preferably used as the floating spheres which are accommodated in the floating sphere filters 54 and 56.

In the exhaust gas purifier of the second embodiment, the exhaust gas of an internal combustion engine such as a diesel engine or the like is, in the same way as in the exhaust gas purifier of the first embodiment, introduced into the exhaust gas purifying tank 2 from the exhaust gas-introducing pipe 4A. In the exhaust gas purifying tank 2, mainly, the hydrocarbons in the exhaust gas, such as soot and uncombusted fuel and the like, are removed.

The exhaust gas, which is guided-out from the exhaust gas purifying tank 2, passes through the floating sphere filter 16, is introduced into the interior of the exhaust gas hood 58, passes through the exhaust gas-introducing pipes 62, and is introduced into the nitrogen oxide removing tanks 60. At the nitrogen oxide removing tanks 60, mainly the nitrogen oxides and sulfur oxides in the exhaust gas are removed.

In addition to the merits of the exhaust gas purifier of the first embodiment, the exhaust gas purifier of the second embodiment has the merit that nitrogen oxides and sulfur oxides in the exhaust gas can be removed even more effectively, and the merit that the outer shape thereof is compact.

(3) Embodiment 3

Figure 4:
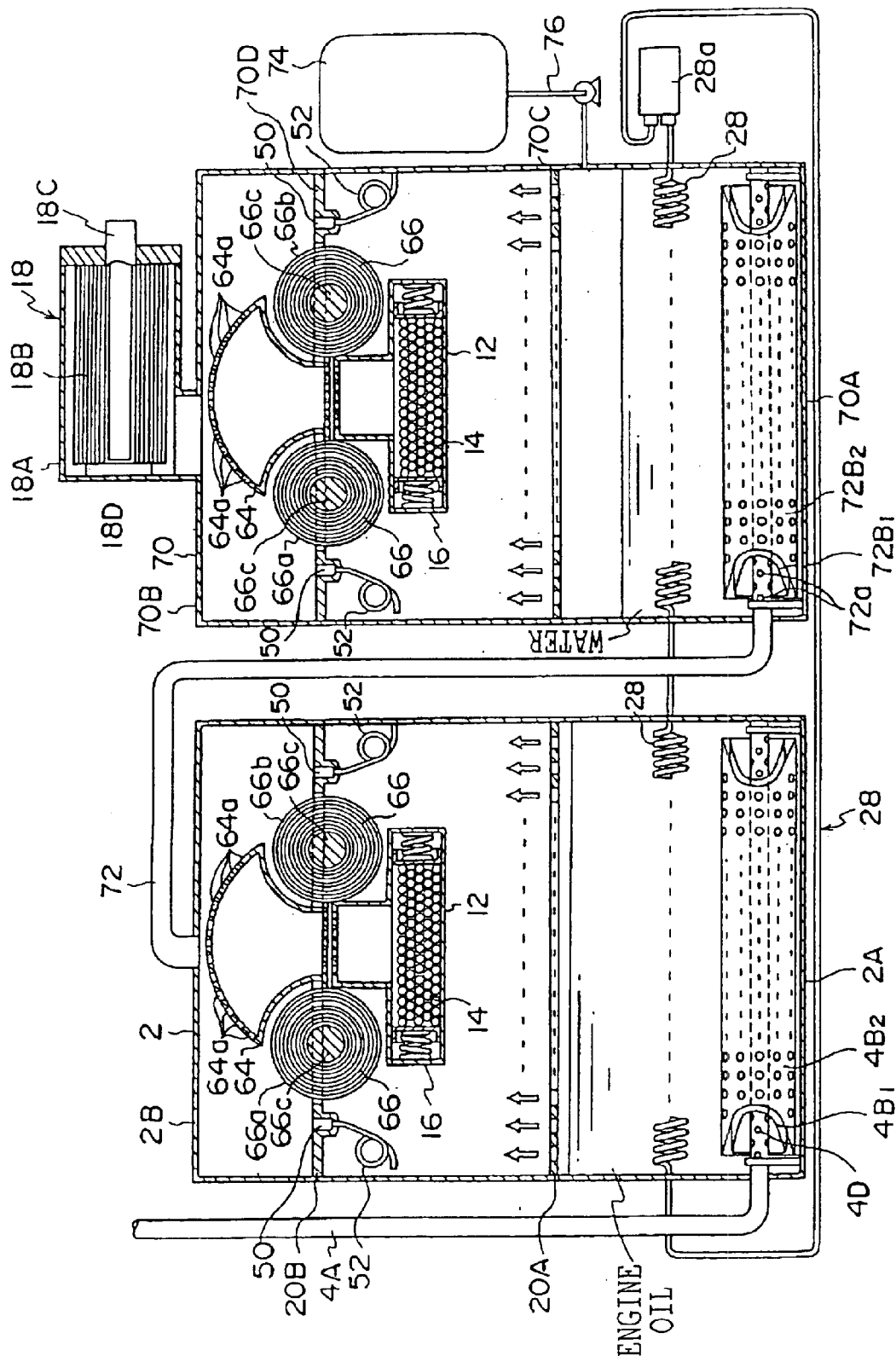
FIG. 4 is a longitudinal sectional view showing another example of the exhaust gas purifier relating to the second embodying aspect of the present invention.

Another example of the exhaust gas purifier relating to the second embodying aspect of the present invention is shown in FIG. 4. In FIG. 4, reference numerals that are the same as those of FIG. 1 denote the same elements as the elements shown in FIG. 1 unless otherwise noted.

As shown in FIG. 4, the exhaust gas purifier of the third embodiment is equipped with an exhaust gas purifying tank 2, in whose interior is accommodated engine oil which is one example of the exhaust gas purifying liquid, and a nitrogen oxide removing tank 70, which is connected to the exhaust gas purifying tank 2 in series and in whose interior water is accommodated. The exhaust gas purifying tank 2 corresponds to the first exhaust gas purifying tank in the exhaust gas purifier relating to the second embodying aspect of the present invention, and the nitrogen oxide removing tank 70 corresponds to the second exhaust gas purifying tank in the exhaust gas purifier.

As shown in FIG. 4, the exhaust gas purifying tank 2 has a vertically-long, rectangular-parallelepiped shape, and the interior thereof is sectioned into three by, from the bottom, the splash-returning plate 20A and the middle plate 20B. Further, the exhaust gas-introducing pipe 4A, which introduces exhaust gas into the exhaust gas purifying tank 2, is provided in the vicinity of the bottom plate 2A.

An inner pulse wave moderating pipe $4B_1$, which is a cylindrical member formed by a punch metal plate, covers the portion of the exhaust gas-introducing pipe 4A at which the exhaust gas jetting openings 4D are provided. Further, an outer pulse wave moderating pipe $4B_2$, which similarly is a cylindrical member formed by a punch metal plate, is provided concentrically outside of the inner pulse wave moderating pipe $4B_1$.

The floating sphere filter 16 is fixed to the bottom surface of the middle plate 20B.

A mist-catching hood 64, which is dome-shaped and into which is introduced the exhaust gas which is guided out from the floating sphere filter 16, is provided at the top surface of the middle plate 20B so as to be directed toward the ceiling plate 2B. Exhaust gas flow-out holes 64a, from which the exhaust gas introduced into the mist-catching hood 64 flows out, are provided in the peripheral edge portion of the mist-catching hood 64. Further, concave portions are formed in the bottom end portion of the mist-catching hood 64 so as to make a room for wound filter containers 66a and 66b described later.

As shown in FIG. 4, a wound filter 66 formed of thin metal wires and having a felt-like appearance is provided between an exhaust gas guide-out opening at the floating sphere filter 16 and an exhaust gas-introducing opening at the mist-catching hood 64 so as to move along the gap between the floating sphere filter 16 and the mist-catching hood 64. The wound filter containers 66a and 66b, which are drum-shaped and which accommodate the wound filter 66 in a state of being wound in rolls, are provided at positions sandwiched between the mist-catching hood 64 and the floating sphere filter 16. The unused wound filter 66 is accommodated in the wound filter container 66a. The used wound filter 66, which has been wound-out from the wound filter container 66a and which has been dirtied by the soot and smoke and the like in the exhaust gas which flows through from the floating sphere filter 16 toward the mist-catching hood 64, is accommodated in the wound filter container 66b.

Figure 5:
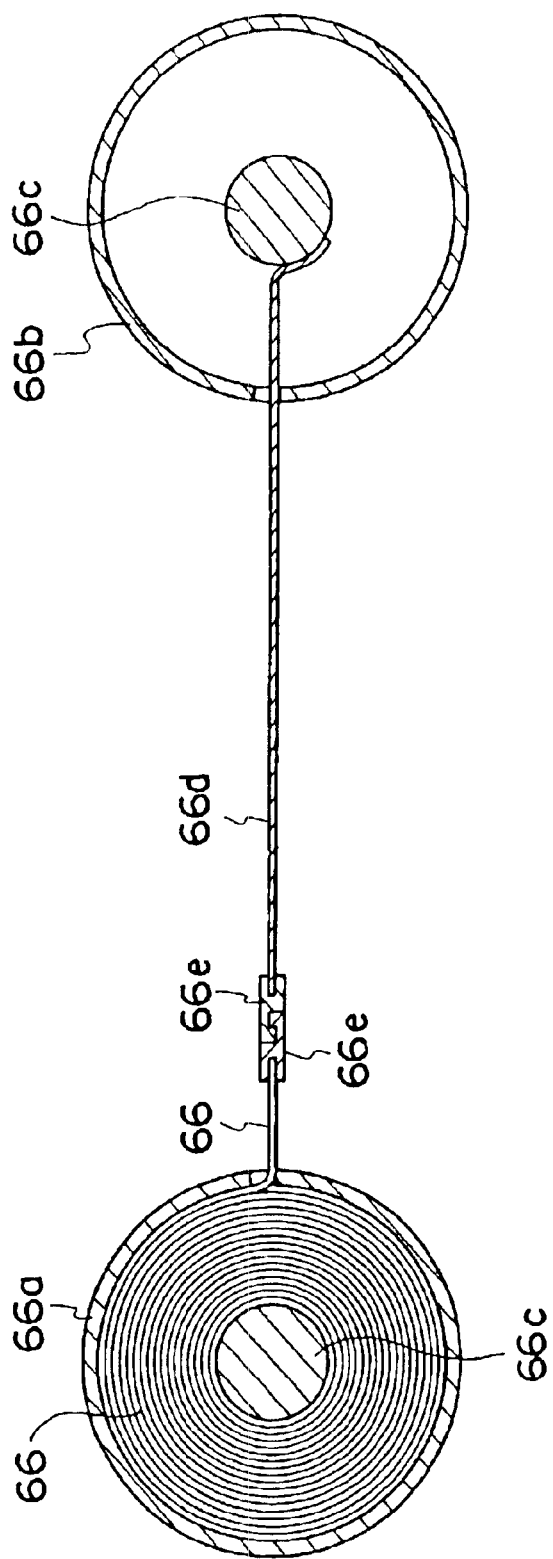
FIG. 5 is a sectional view showing in detail a structure of a wound filter with which the exhaust gas purifier shown in FIG. 4 is equipped.

Details of the wound filter containers 66a and 66b and the wound filter 66 are shown in FIG. 5. As shown in FIG. 5, the wound filter containers 66a and 66b are both provided with a wind-up shaft 66c on which the wound filter 66 is wound up. A pull-out sheet 66d, which has a rectangular shape and functions to pull the wound filter 66 out, is fixed to the wind-up shaft 66c. Note that a sheet or the like, which is cut to a size corresponding to one rotation of the wound filter 66, can be used as the pull-out sheet 66d. Further, in place of the felt-shaped filter formed from thin metal wires, filters formed from glass fibers, filters formed from natural fibers such as linen, cotton, silk, wool, or the like, filters in which sand, limestone powder, active charcoal, straw, large sawdust or sponge is carried on a gas permeable, or the like, can be used as the wound filter 66.

One end of the wound filter 66, which is accommodated within the wound filter container 66a, is mounted via a pair of detachable hooks 66e, which are formed so as to be detachable from one another, to the side end of the pull-out sheet 66d opposite to the side end portion fixed to the wind-up shaft 66c.

As shown in FIG. 4, an exhaust gas-introducing pipe 72, which introduces the exhaust gas into the nitrogen oxide-removing tank 70, is connected to the exhaust gas guide-out opening of the exhaust gas purifying tank 2.

The exhaust gas-introducing pipe 72 extends through the interior of the nitrogen oxide-removing tank 70 along a bottom plate 70A of the nitrogen oxide-removing tank 70. A large number of exhaust gas jetting openings 72a, which introduce the exhaust gas into the water accommodated in the nitrogen oxide removing tank 70, are formed in the exhaust gas-introducing pipe 72. Further, an inner pulse wave moderating pipe 72B$_1$ and an outer pulse wave moderating pipe 72B$_2$ are provided in the same way that the inner pulse wave moderating pipe 4B$_1$ and the outer pulse wave moderating pipe 4B$_2$ are provided.

As shown in FIG. 4, the nitrogen oxide removing tank 70 has almost the same structure as the exhaust gas purifying tank 2, and the interior is sectioned into three levels by a splash-returning plate 70C and a middle plate 70D. However, the nitrogen oxide removing tank 70 is different from the exhaust gas purifying tank 2 in that water is accommodated in the interior, and that spheres formed from an anti-corrosive material such as gun metal spheres or the like are accommodated as the floating spheres in the floating sphere filter 16, and that the wound filter 66 is formed from gun metal.

An exhaust gas guide-out opening is provided in a ceiling plate 70B of the nitrogen oxide removing tank 70, and the exhaust gas cleaner 18 is connected to the exhaust gas guide-out opening.

A replenishing water tank 74, which stores water for replenishment, and a water replenishing conduit 76, which supplies water from the replenishing water tank 74 to the nitrogen oxide removing tank 70, are connected to the nitrogen oxide removing tank 70.

As shown in FIG. 4, a cooling conduit 28, which cools the engine oil accommodated in the exhaust gas purifying tank 2 and the water accommodated in the nitrogen oxide removing tank 70, is provided at the exhaust gas purifier of embodiment 3. Within the exhaust gas purifying tank 2 and the nitrogen oxide-removing tank 70, the cooling conduit 28 is wound in a coil form. A circulating pump 28a, which circulates the coolant flowing through the interior, is mounted on the cooling conduit 28.

Operation of the exhaust gas purifier of embodiment 3 is as follows.

In the exhaust gas purifier of the third embodiment, in the same way as the exhaust gas purifiers of the first embodiment and example 2, the exhaust gas from a diesel engine or a gasoline engine or the like is introduced into the exhaust gas purifying tank 2 through the exhaust gas-introducing pipe 4A. The disgorge pressure of the exhaust gas, which is discharged into the exhaust gas purifying tank 2 form the exhaust gas jetting openings 4D, is weakened at an inner punch metal cylinder 2b and an outer punch metal cylinder 2c. Thus, the engine oil in the exhaust gas purifying tank 2 little scatter in a mist-form due to the disgorge pressure of the exhaust gas.

In the exhaust gas purifying tank 2, mainly, hydrocarbons such as soot and the like in the exhaust gas are removed.

The exhaust gas which is guided-out from the exhaust gas purifying tank 2 passes through the floating sphere filter 16, passes through the wound filter 66, and is introduced into the interior of the mist-catching hood 64.

At least the wound filter 66 removes a portion of the splash of the engine oil and the soot and the like in the exhaust gas. The splash of the engine oil and the soot and the like, which are not removed by the wound filter 66, directly advance to the interior of the mist-catching hood 64, and adhere to the peak portion and the vicinity thereof on the inner walls of the mist-catching hood 64. On the other hand, the exhaust gas flows along the inner walls of the mist-catching hood 64 toward its peripheral portion, and flows out from the exhaust gas flow-out openings 64a to the exterior thereof.

The exhaust gas which flows out to the exterior of the mist catching hood 64 passes through a connecting pipe 72, and is introduced into the nitrogen oxide-removing tank 70.

In the nitrogen oxide removing tank 70, the exhaust gas, from which mainly nitrogen oxides, sulfur oxides, and carbon monoxide have been removed, passes through the floating sphere filter 16 and the mist-catching hood 64, and is discharged to the exterior through the exhaust gas cleaner 18.

In the exhaust gas purifier of the third embodiment, the pulling-out and winding-up of the wound filter 66 at the wound filter containers 66a and 66b can be carried out by the following processes.

The one of the detachable hooks 66e, which is fixed to the final end of the pull-out sheet 66d at the interior of the wound filter container 66a, is made to mesh with the other of the detachable hooks 66e at the wound filter 66. The pull-out sheet 66d and the wound filter 66 are thus connected, and the wind-up shaft 66c of the wound filter container 66b is rotated such that the wound filter 66 is pulled-out. When the wound filter 66 is dirtied, the wind-up shaft 66c is rotated further, and the wound filter 66 is wound-up into the interior of the wound filter container 66a by a length corresponding to one rotation, and a new portion of the wound filter 66 is positioned between the floating sphere filter 16 and the mist-catching hood 64. When the wound filter 66 is completely wound-up into the interior of the wound filter container 66a, the detachable hooks 66e are removed, the connection between the wound filter 66 and the pull-out sheet 66d is undone, and the wound filter container 66a is removed.

Note that the pulling-out and winding-up of the wound filter 66 can be carried out automatically by using a timer and a motor or the like.

In the exhaust gas purifier of embodiment 3, even when the disgorge pressure of the exhaust gas is high, the engine oil and the water scatter little. Accordingly, the exhaust gas purifier of embodiment 3 can be preferably used particularly in large-sized diesel vehicles in which diesel engines having large exhaust amounts are mounted such as large-sized trucks and busses and in large-sized construction machinery, and the like.

(4) Embodiment 4

Figure 6:
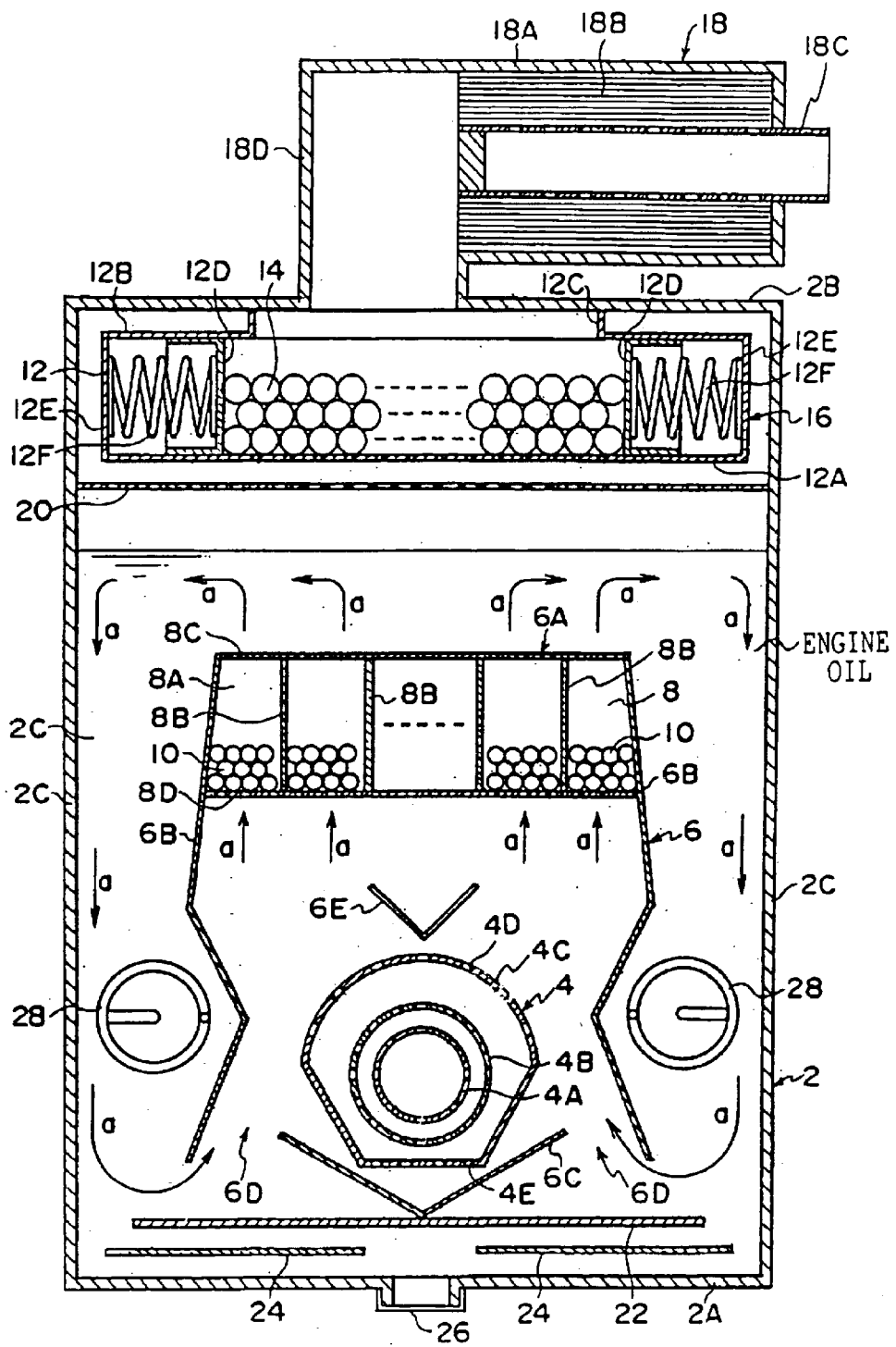
FIG. 6 is a longitudinal sectional view showing an example of an exhaust gas purifier relating to an eighth embodying aspect of the present invention.

An example of an exhaust gas purifier relating to an eighth embodying aspect of the present invention is shown in FIG. 6. In FIG. 6, reference numerals which are the same as those of FIG. 1 and FIG. 2 denote similar elements as the elements denoted by those reference numerals in FIG. 1 and FIG. 2.

As shown in FIG. 6, the exhaust gas purifier relating to the fourth embodiment has the exhaust gas purifying tank 2 having a vertically-long, rectangular-parallelepiped shape, in which an exhaust gas purifying liquid such as engine oil or the like is accommodated, and an exhaust gas jetting portion 4 extending horizontally in the vicinity of the bottom plate 2A in the interior of the exhaust gas purifying tank 2 and jetting exhaust gas upwardly.

At the interior of the exhaust gas purifying tank 2 is provided an exhaust gas flow guiding duct 6 which accommodates the exhaust gas jetting portion 4 at the bottom portion thereof and which extends upwardly, i.e., along the direction of jetting the exhaust gas from the exhaust gas jetting portion 4.

The height of the liquid surface of the exhaust gas purifying liquid in the exhaust gas purifying tank 2 is either a level at which the exhaust gas flow guiding duct 6 is submerged beneath the liquid surface, or higher than that.

As shown in FIG. 6, the exhaust gas jetting portion 4 is equipped with an exhaust gas jetting pipe 4C and an exhaust gas-introducing pipe 4A. The exhaust gas jetting pipe 4C extends in the horizontal direction and its top half portion is semicircular shaped and its bottom half portion has a trapezoidal cross-section. A large number of the exhaust gas getting openings 4D are formed in the entire surface of the top half portion. The exhaust gas-introducing pipe 4A is provided inside of the exhaust gas jetting pipe 4C in the direction parallel thereto. The exhaust gas-introducing pipe 4A is a perforated pipe of which entire surface a large number of holes are formed.

Auxiliary exhaust gas jetting openings 4E, which jet exhaust gas downwardly, are formed in the bottom portion of the exhaust has jetting pipe 4C as well.

A pulse wave moderating pipe 4B, Which is formed of a punch metal plate having a large number of holes in the entire surface thereof, is provided between the exhaust gas-introducing pipe 4A and the exhaust gas jetting pipe 4C, coaxial to the exhaust gas jetting pipe 4C.

As shown in FIG. 6, the exhaust gas flow guiding duct 6 is equipped with a pair of side plates 6B which are positioned at sides opposite one another such that the exhaust gas jetting portion 4 is located between them, and a bottom plate 6C which is positioned directly beneath the exhaust gas jetting portion 4 and is formed in a flat V-shape.

As shown in FIG. 6, the side plates 6B are disposed substantially parallel to one another, and at the top end portions, together with the side plates 2C forming the front and rear surfaces of the exhaust gas purifying tank 2, form exhaust gas guide-out openings 6A at the exhaust gas flow guiding duct 6. Hereinafter, "front" is the direction coming out from the surface of the paper of the drawings of FIG. 6 and figures thereafter, and "back" is the direction directed toward the paper surface of the figures. Note that, in FIG. 6 and figures thereafter, the side plate 2C forming the front surface of the exhaust gas purifying tank 2 is omitted. Because the exhaust gas guide-out openings 6A are positioned at the top end of the exhaust gas flow guiding duct 6, they can also be called opening portions provided at the downstream side to the direction of jetting the exhaust gas at the exhaust gas jetting portion 4.

Purifying liquid return openings 6D, which are slot-shaped opening portions, are formed between the side plates 6B and the bottom plate 6C. Because the purifying liquid return openings 6D are open at the bottom end of the exhaust gas flow guiding duct 6, they can be called opening portions provided at the downstream side with respect to the direction of jetting the exhaust gas at the exhaust gas jetting portion 4.

An agitating sphere accommodating chamber 8, which accommodates agitating spheres 10 described later, is formed in the vicinity of the exhaust gas guide-out openings 6A of the exhaust gas flow guiding duct 6. The agitating sphere accommodating chamber 8 is partitioned in a gridiron form as seen from above, by vertically equipped side walls 8B. The side walls 8B are rubber-lined for the purpose of mitigating the impact from the agitating spheres 10. At the agitating sphere accommodating chamber 8, the spaces that are partitioned by the side walls 8B are called "agitating sphere rooms 8A" hereinafter.

As shown in FIG. 6, the agitating sphere rooms 8A are provided with a ceiling plate 8C and a bottom plate 8D which are respectively formed from punch metal plates, and are formed such that the exhaust gas can flow in the vertical direction through the interiors. The agitating spheres 10 are accommodated in the interiors of the agitating sphere rooms 8A. The agitating sphere accommodating portion 8 and the agitating spheres 10 correspond to the exhaust gas purifying liquid agitating portion in the exhaust gas purifier of the present invention.

In the exhaust gas purifier shown in FIG. 6, 10 to 15 agitating spheres 10 are accommodated in the interior of each of the agitating sphere rooms 8A. However, the number of the agitating spheres 10 accommodated in the agitating sphere room 8A is not particularly limited. Accordingly, the number of the agitating spheres 10 in each agitating sphere room 8A can be 1 or a specific number, two or more.

Steel balls, such as pachinko balls, ball bearing spheres, and the like, and metal spheres such as stainless steel spheres, gunmetal spheres, brass spheres, bronze spheres, aluminum bronze spheres, phosphor bronze spheres, beryllium bronze spheres, cupronickel spheres, and the like, may be used as the agitating spheres 10.

Usually, spheres having a diameter of about 3 to 20 mm are used as the metal spheres. However, the diameter of the metal spheres is not limited to this range.

Figure 7:
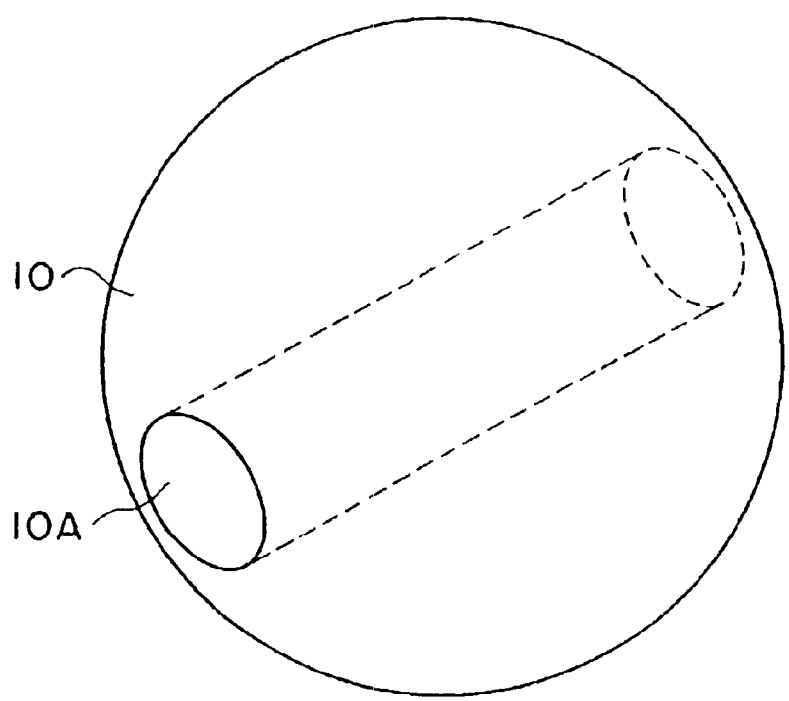
FIG. 7 is a perspective view showing another example of an agitating sphere used in the exhaust gas purifier shown in FIG. 6.

In addition, a rubber-covered metal sphere, in which the surface of a metal sphere is covered with an oil-resistant rubber, can be used as the agitating sphere 10. Further, as shown in FIG. 7, a hole-opened sphere, in which a through hole 10A is formed in the diameter direction of the metal sphere, is also preferable as the agitating sphere 10.

As shown in FIG. 6, a V-shaped plate 6E, which has a V-shaped cross-section and uniformly distributes to the respective agitating sphere rooms 8A the exhaust gas which is jetted out from the exhaust gas jetting portion 4, is provided between the agitating sphere accommodating portion 8 and the exhaust gas jetting portion 4 at the interior of the exhaust gas flow guiding duct 6.

Further, in the exhaust gas purifier shown in FIG. 6, the floating sphere filter 16 is provided in the vicinity of the ceiling plate 2B of the exhaust gas purifying tank 2. The structure of the floating sphere filter 16 is as was described in the section about the exhaust gas purifier relating to embodiment 1.

The exhaust gas cleaner 18, which further purifies the exhaust gas which has flowed through the interior of the floating sphere filter 16, is provided at the central portion of the ceiling plate 2B of the exhaust gas purifying tank 2. The exhaust gas cleaner 18 has the same structure as described in the section bout the exhaust has purifier relating to the first embodiment.

The splash-returning plate 20, which is formed by a punch metal plate, is provided horizontally beneath the floating sphere filter 16 at the interior of the exhaust gas purifying tank 2.

On the other hand, as shown in FIG. 6, the lower plate 22 is provided in the horizontal direction between the bottom plate 2A of the exhaust gas purifying tank 2 and the bottom plate 6C of the exhaust gas flow guiding duct 6. A pair of exhaust mud separating plates 24 is provided horizontally between the lower plate 22 and the bottom plate 2A of the exhaust gas purifying tank 2.

Moreover, a drain opening 26 is provided at the central portion of the bottom plate 2A of the exhaust gas purifying tank 2. The drain opening 26 is usually closed.

As shown in FIG. 6, the cooling conduits 28, which are coil shaped and cool the engine oil within the exhaust gas purifying tank 2, are provided along the horizontal direction between the side plates 6B of the exhaust gas flow guiding duct 6 and the side plates 2C of the exhaust gas purifying tank 2.

Note that, in the exhaust gas purifier shown in FIG. 6, a second-stage exhaust gas purifier, having a similar structure as the above-described exhaust gas purifier and of which exhaust gas purifying tank is filled with water or an alkaline aqueous solution instead of engine oil, can be connected in place of the exhaust gas cleaner 18.

In accordance with the above-described exhaust gas purifier, not only soot in the exhaust gas, but also nitrogen oxides and sulfur oxides can be effectively removed.

Hereinafter, operation of the exhaust gas purifier shown in FIG. 6 will be described.

When exhaust gas from a diesel engine or the like is introduced into the exhaust gas-introducing pipe 4A, the exhaust gas is jetted out from the periphery of the exhaust gas-introducing pipe 4A. The majority thereof rises through the interior of the exhaust gas flow guiding duct 6 from the exhaust gas jetting openings 4D at the exhaust gas jetting pipe 4C, and is guided-out toward the liquid surface of the engine oil at the exhaust gas purifying tank 2 from the exhaust gas guide-out openings 6A. Then, the exhaust gas, which has passed through the engine oil, passes through the floating sphere filter 16 and the exhaust gas cleaner 18, and is discharged to the exterior of the exhaust gas purifier. at the exhaust gas jetting pipe 4C, and is guided-out toward the liquid surface of the engine oil at the exhaust gas purifying tank 2 from the exhaust gas guide-out openings 6A. Then, the exhaust gas, which has passed through the engine oil, passes through the floating sphere filter 16 and the exhaust gas cleaner 18, and is discharged to the exterior of the exhaust gas purifier.

Because the pressure and the flow rate of the exhaust gas which is introduced from the exhaust gas-introducing pipe 4A fluctuate in accordance with the cycles at the internal combustion engine, such as a diesel engine or the like which is the source of discharge, wave motion in a pulse-waveform (hereinafter, "pulse waves") arises at the periphery of the exhaust gas-introducing pipe 4A due to the fluctuations in the pressure and the flow rate.

At the pulse wave moderating pipe 4B, the pulse waves are moderated to a certain extent, and are transmitted to the agitating sphere accommodating chamber 8 via the engine oil which is in the exhaust gas flow guiding duct 6.

The ceiling plate 8C and the bottom plate 8D of the agitating sphere rooms 8A at the agitating-sphere accommodating chamber 8 are both formed from punch metal plates as described above. Thus, the pulse waves are transmitted to the agitating spheres 10 as well.

Accordingly, the agitating spheres 10 move upwardly and downwardly due to the pulse waves, and the pulse waves are thereby further moderated.

In case that the pressure of the exhaust gas introduced from the exhaust gas-introducing pipe 4A is high, the engine oil may be scattered into splash and discharged with the exhaust gas due to the pressure thereof. However, the majority of the engine oil hits the splash-returning plate 20, and is returned to the exhaust gas purifying tank 2.

One portion of the engine oil passes through the holes of the splash-returning plate 20. However, when the exhaust gas passes through the floating sphere filter 16, this engine oil adheres to the surfaces of the floating spheres 14.

Here, the exhaust gas purifier shown in FIG. 6 is usually used on a large-sized automobile such as a truck. Thus, at the time of use, the exhaust gas purifier receives vibrations from the road surface, and as described in the section about the exhaust gas purifier relating to the first embodiment, the floating spheres 14 swing at the interior of the floating sphere filter 16. Accordingly, even if engine oil adheres to the surfaces of the floating spheres 14, the floating spheres 14 do not stick with one another into a single clump. Further, when a large amount of engine oil adhere on the surfaces of the floating spheres 14, the engine oil drips down from the surfaces of the floating spheres 14, and returns to the exhaust gas purifying tank 2 through the holes in the bottom plate 12A of the floating sphere accommodating chamber 12.

Accordingly, the splash of the engine oil within the exhaust gas is almost completely removed at the floating sphere filter 16. Thus, the exhaust gas cleaner 18 does not become dirty of the splash of the engine oil so much.

While, the engine oil within the exhaust gas flow guiding duct 6 is dragged by the flow of the exhaust gas in the interior of the exhaust gas flow guiding duct 6, rises in the interior of the exhaust gas flow guiding duct 6, passes through the agitating sphere accommodating chamber 8, and is guided-out upwardly from the exhaust gas guide-out openings 6A. Then, at the interior of the agitating sphere accommodating chamber 8, the agitating spheres 10 move upwardly and downwardly due to the pulse waves of the exhaust gas, and the engine oil is so strongly agitated that the engine oil and the exhaust gas sufficiently contact one another. The soot in the exhaust gas is caught up by the engine oil and removed.

As shown by arrows a in FIG. 6, although the engine oil is guided out upwardly, the flow direction of the engine oil is changed to the horizontal direction toward the side walls 2C at the liquid surface of the engine oil in the exhaust gas purifying tank 2. Then, in the vicinities of the side walls 2C, the oil flow is bent downwardly.

Here, due to the engine oil being guided out from the exhaust gas guide-out openings 6A, the interior pressure in the exhaust gas flow-guiding duct 6 is reduced. Thus, the engine oil which has fallen down along the side walls 2C of the exhaust gas purifying tank 2 is sucked into the interior of the exhaust gas flow guiding duct 6 through the purifying liquid return openings 6D.

In this way, at the interior of the exhaust gas purifying tank 2, a circulating flow of engine oil arises as shown by the arrows a.

Note that the soot adsorbed into the engine oil, for example, accumulates on the bottom plate 6C of the exhaust gas flow-guiding duct 6. However, as shown by arrow b in FIG. 6, a portion of the exhaust gas which is introduced from the exhaust gas-introducing pipe 4A is jetted downwardly toward the bottom plate 6C from the auxiliary exhaust gas jetting openings 4E at the exhaust gas jetting pipe 4C. Thus, the soot accumulating on the bottom plate 6C is blown off by the jetting flow b of exhaust gas.

Accordingly, soot can be prevented from accumulating in a large amount on the bottom plate 6C.

In the exhaust gas purifier relating to embodiment 4, as described above, due to the jetted flow of exhaust gas, a circulating flow, in the vertical direction, of the engine oil arises in the interior of the exhaust gas purifying tank 2. Further, when this engine oil passes through the agitating sphere accommodating portion 8, it is strongly agitated by the agitating spheres 10.

Accordingly, the exhaust gas efficiently contacts the engine oil.

Further, the viscosity of the engine oil is about 10 to 100,000 cSt at a room temperature, which is extremely high as compared to the viscosity of water.

For the above-described reasons, in the exhaust gas purifier relating to embodiment 4, soot within the exhaust gas can be caught up in the engine oil and removed even more efficiently than the exhaust gas purifier relating to the first embodiment.

(5) Embodiment 5

Figure 8:
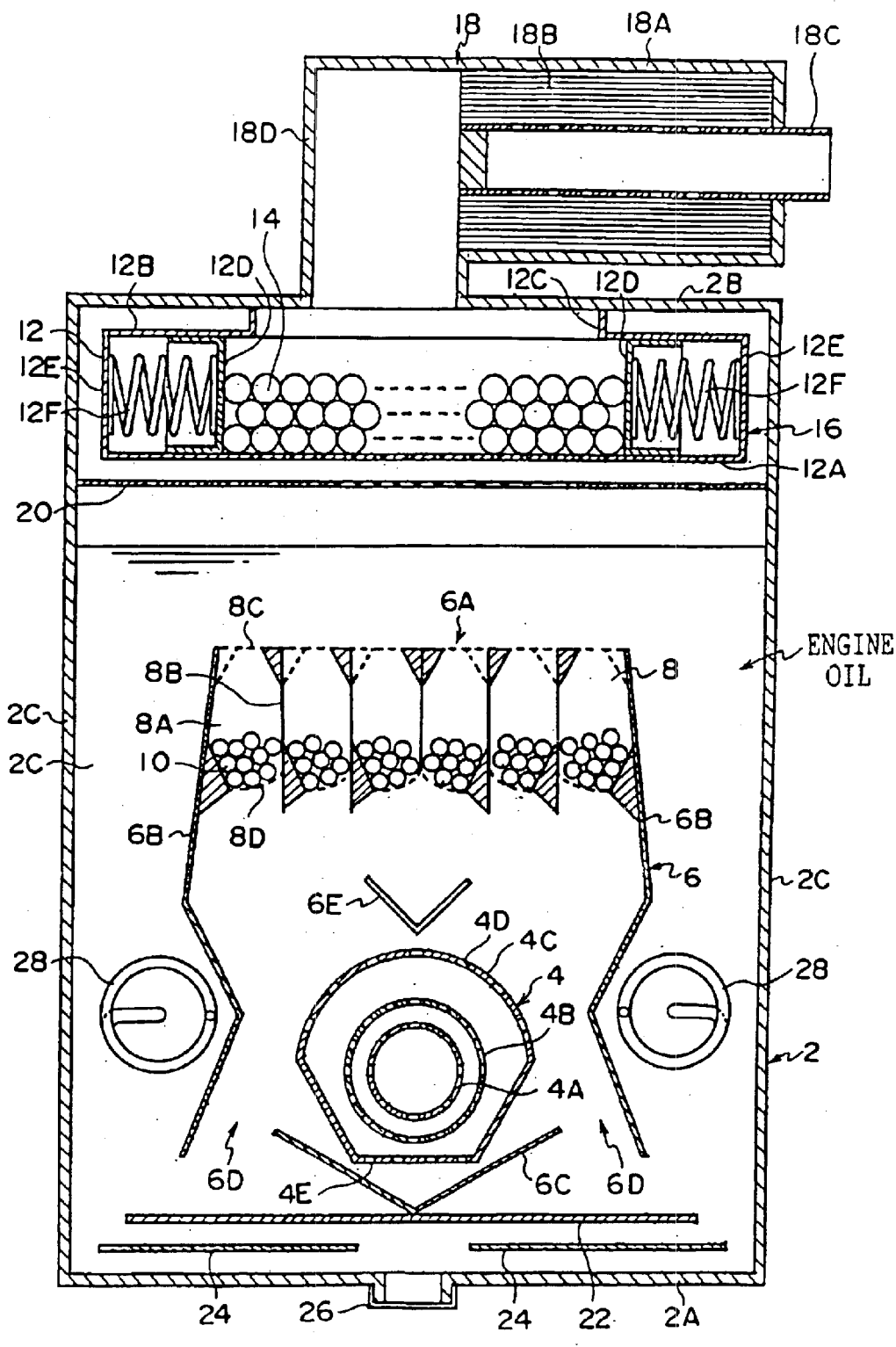
FIG. 8 is a sectional view showing another example of the exhaust gas purifier relating to the eighth embodying aspect of the present invention.

Another example of the exhaust gas purifier relating to the present invention is shown in FIG. 8. In FIG. 8, reference numerals which are the same as those of FIG. 6 and FIG. 7 denote the same elements as the elements denoted by these reference numerals in FIG. 6 and FIG. 7 unless otherwise noted.

As shown in FIG. 8, in the exhaust gas purifier relating to the fifth embodiment, the agitating sphere accommodating chamber 8 is sectioned into the agitating sphere rooms 8A which are small chambers accommodating the agitating spheres 10. The inner walls of the agitating sphere rooms 8A are formed on the whole in configurations contracting toward the top and the bottom, or in other words, are formed in a substantial egg-like or rice grain-like shape.

Figure 9:
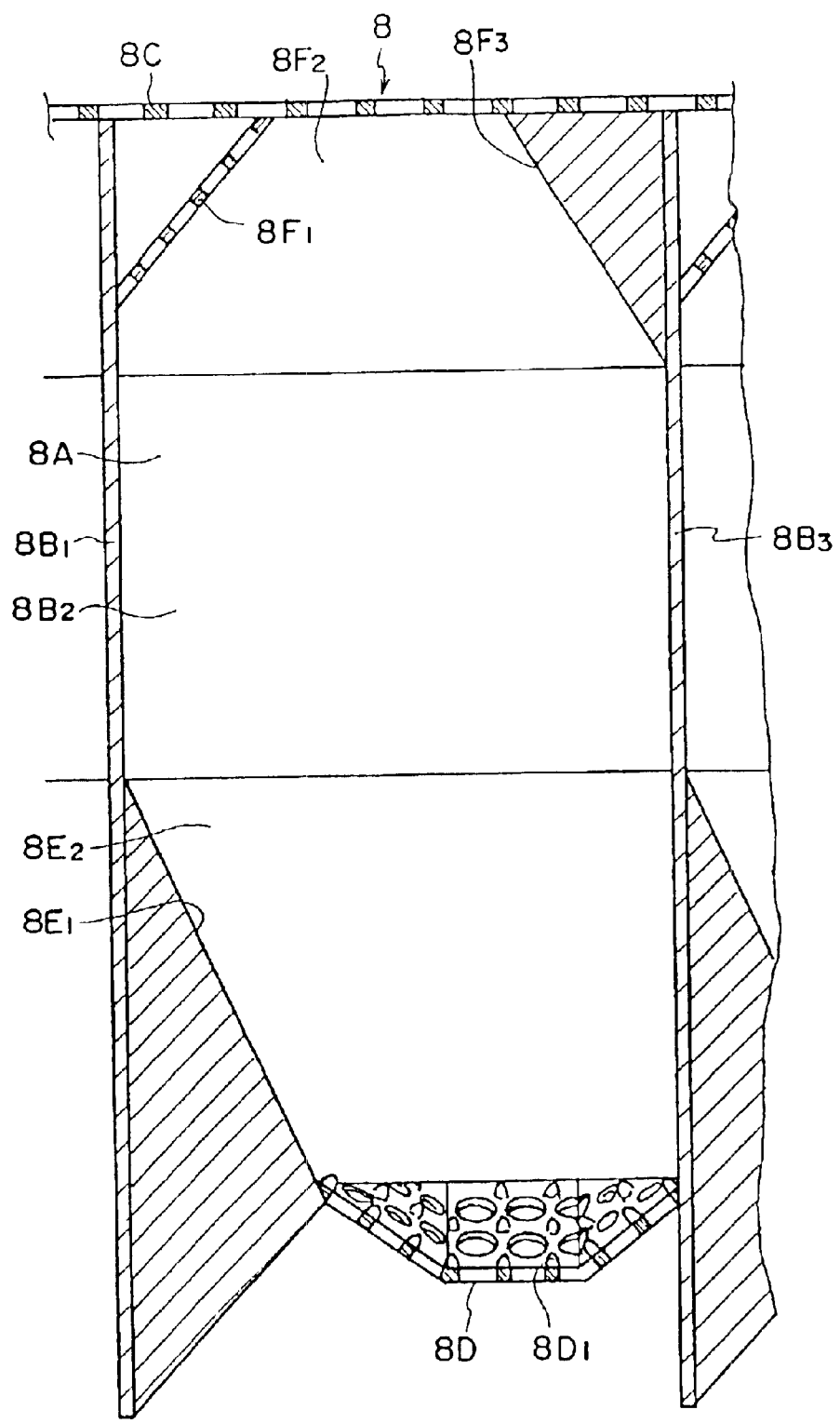
FIG. 9 is an enlarged sectional view showing in detail an agitating sphere room in the exhaust gas purifier shown in FIG. 8.

Details of the agitating sphere room 8A are shown in FIG. 9.

As shown in FIG. 9, the bottom plate 8D of the agitating sphere room 8A is formed of a punch metal plate curved downward. Corniculate projections $8D_1$, which prevent the agitating spheres 10 from fixing to the bottom plate 8D, are formed on the upper surface of the bottom plate 8D. A flat-plate-shaped punch metal plate forms the ceiling plate 8C of the agitating sphere room 8A.

The four side walls 8B surrounding the agitating sphere room 8A are all provided in the vertical direction. Further, a lower portion inclined surface $8E_1$, which is inclined toward a third side wall $8B_3$ facing a first side wall $8B_1$, is formed at the lower half portion of the first sidewall $8B_1$. Similarly, a lower portion inclined surface $8E_2$, which is inclined toward a fourth side wall $8B_4$ facing a second side wall $8B_2$, is formed at the lower half portion of the second side wall $8B_2$ adjacent to the first side wall $8B_1$. Note that, in FIG. 9, the fourth side wall $8B_4$ and the agitating spheres 10 are omitted. The bottom ends of the lower portion inclined surfaces $8E_1$ and $8E_2$ are connected to the bottom plate 8D.

On the other hand, upper end portion inclined surfaces $8F_1$ to $8F_4$, which respectively contract toward the top, are formed at the top end portions of the first side wall $8B_1$ to the fourth side wall $8B_4$.

Among the upper end portion inclined surfaces $8F_1$ to $8F_4$, the upper end portion inclined surface $8F_1$ which is positioned at the top end of the first side wall $8B_1$ is formed by a punch metal plate as shown in FIG. 9. Similarly, the upper end portion inclined surface $8F_4$ which is positioned at the top end of the fourth side wall $8B_4$ is also formed by a punch metal plate. Note that, in FIG. 9, the upper end portion inclined surface $8F_4$ is omitted.

Figure 10:
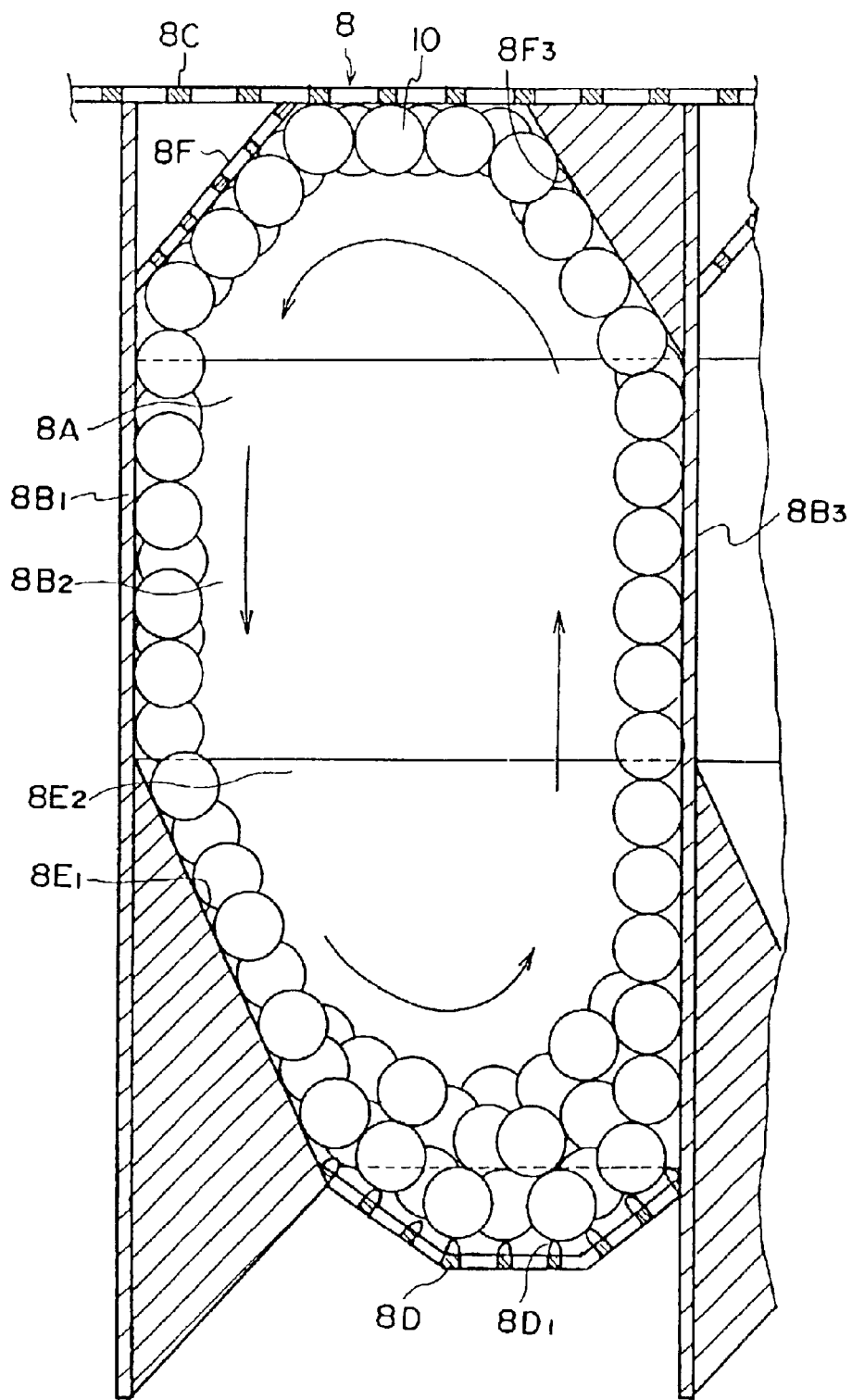
FIG. 10 is an enlarged sectional view showing a movement of the agitating spheres in an interior of the agitating sphere room shown in FIG. 9.

The agitating spheres 10 moving upward and downward in the interior of the agitating sphere room 8A is shown in FIG. 10.

As shown in FIG. 10, due to the pressure of the exhaust gas from the bottom plate 8D, a portion of the agitating spheres 10 on the bottom plate 8D rise along the third side wall $8B_3$, and the remainder rise along the fourth side wall $8B_4$.

The agitating spheres 10 which rise along the third side wall $8B_3$ rise along the upper end portion inclined surface $8F_3$ at the third side wall $8B_3$, and roll on the bottom surface of the ceiling plate 8C toward the upper end portion inclined surface $8F_1$ at the first sidewall $8B_1$. Then, the agitating spheres 10 fall down along the upper end portion inclined surface $8F_1$ and the first side wall $8B_1$. The agitating spheres 10 which have fallen down along the first side wall $8B_1$ roll on the bottom portion inclined surface $8E_1$ of the first side wall $8B_1$ toward the bottom plate 8D.

Similarly, the agitating spheres 10 which rise along the fourth side wall $8B_4$ rise along the upper end portion inclined surface $8F_4$ at the fourth side wall $8B_4$, and roll on the bottom surface of the ceiling plate 8C toward the upper end portion inclined surface $8F_2$ at the second side wall $8B_2$. Then, the agitating spheres 10 fall down along the upper end portion inclined surface $8F_2$ and the second side wall $8B_2$. The agitating spheres 10 which have fallen down along the second side wall $8B_2$ roll on the bottom portion inclined surface $8E_2$ of the second side wall $8B_2$ toward the bottom plate 8D.

Accordingly, as shown in FIG. 10, the agitating spheres 10 move up and down while tracing an oval locus in counter-clockwise direction along the inner wall surfaces of the agitating sphere room 8A. Thus, as compared with the exhaust gas purifier relating to the first embodiment, the movement of the agitating spheres 10 is smoother. Further, in the state in which no exhaust gas is flowing through, the agitating spheres 10 are in a state of contacting the distal ends of the projections $D_1$ at the bottom plate 8D. Thus, the agitating spheres 10 are prevented from sticking on the surface of the bottom plate 8D.

Other than the above-described points, the exhaust gas purifier relating to the fifth embodiment has a similar structure as that of the exhaust gas purifier relating to the fourth embodiment.

Further, the exhaust gas purifier relating to the fifth embodiment is similar to the exhaust gas purifier relating to the fourth embodiment also with regard to the point that, due to the jetted flow of exhaust gas from the exhaust gas jetting portion 4, a circulating flow of engine oil is generated which exits from the exhaust gas guide-out openings 6A of the exhaust gas flow guiding duct 6, and goes around the interior of the exhaust gas purifying tank 2 along the inner walls of the exhaust gas purifying tank 2, and returns into the exhaust gas flown guiding duct 6 through the purifying liquid return openings 6D.

In addition to the merits of the exhaust gas purifier relating to the fourth embodiment, the exhaust gas purifier relating to the fourth embodiment also has the merit that, when the output of the engine is low, i.e., even in case when the disgorge pressure of the exhaust gas is low, agitation of the exhaust gas in the agitating sphere accommodating chamber 8 can be carried out reliably.

(6) Embodiment 6

Figure 11:
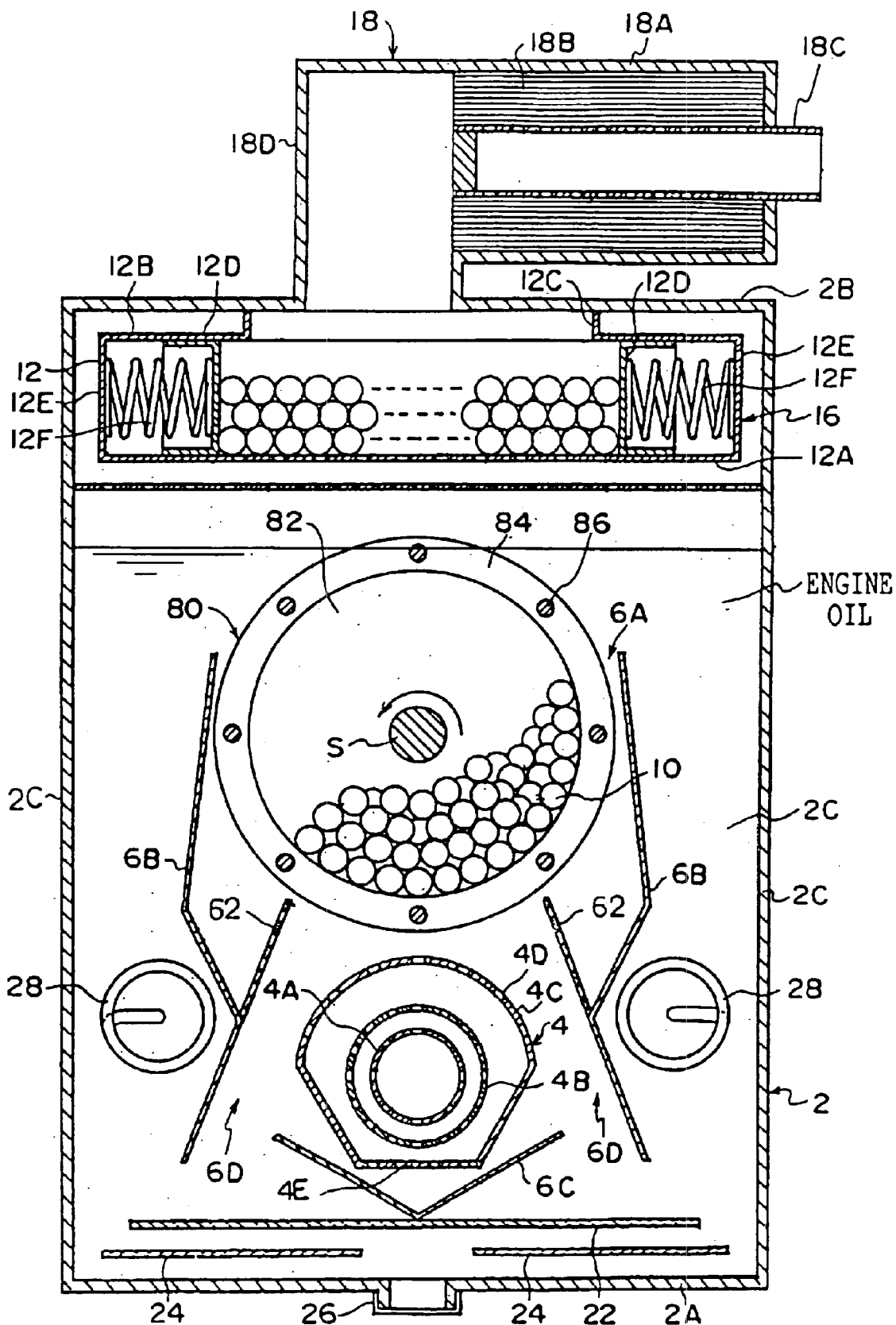
FIG. 11 is a sectional view showing another example of an exhaust gas purifier relating to a tenth embodying aspect of the present invention.

An example wherein a agitating sphere rotating container, which is cylindrical and serves as a agitating sphere accommodating chamber, is used in the exhaust gas purifier relating to the present invention, is shown in FIG. 11. In FIG. 11, the same reference numerals as those of FIG. 6 and FIG. 7 denote the same elements as the elements denoted by these reference numerals in FIG. 6 and FIG. 7 unless otherwise noted.

As shown in FIG. 11, in the exhaust gas purifier relating to the sixth embodiment, a agitating sphere rotating container 80 is formed in a basket shape having a substantially cylindrical shape, and rotates or revolves around a rotating shaft S provided horizontally along the axis of the agitating sphere rotating container 80.

Figure 12:
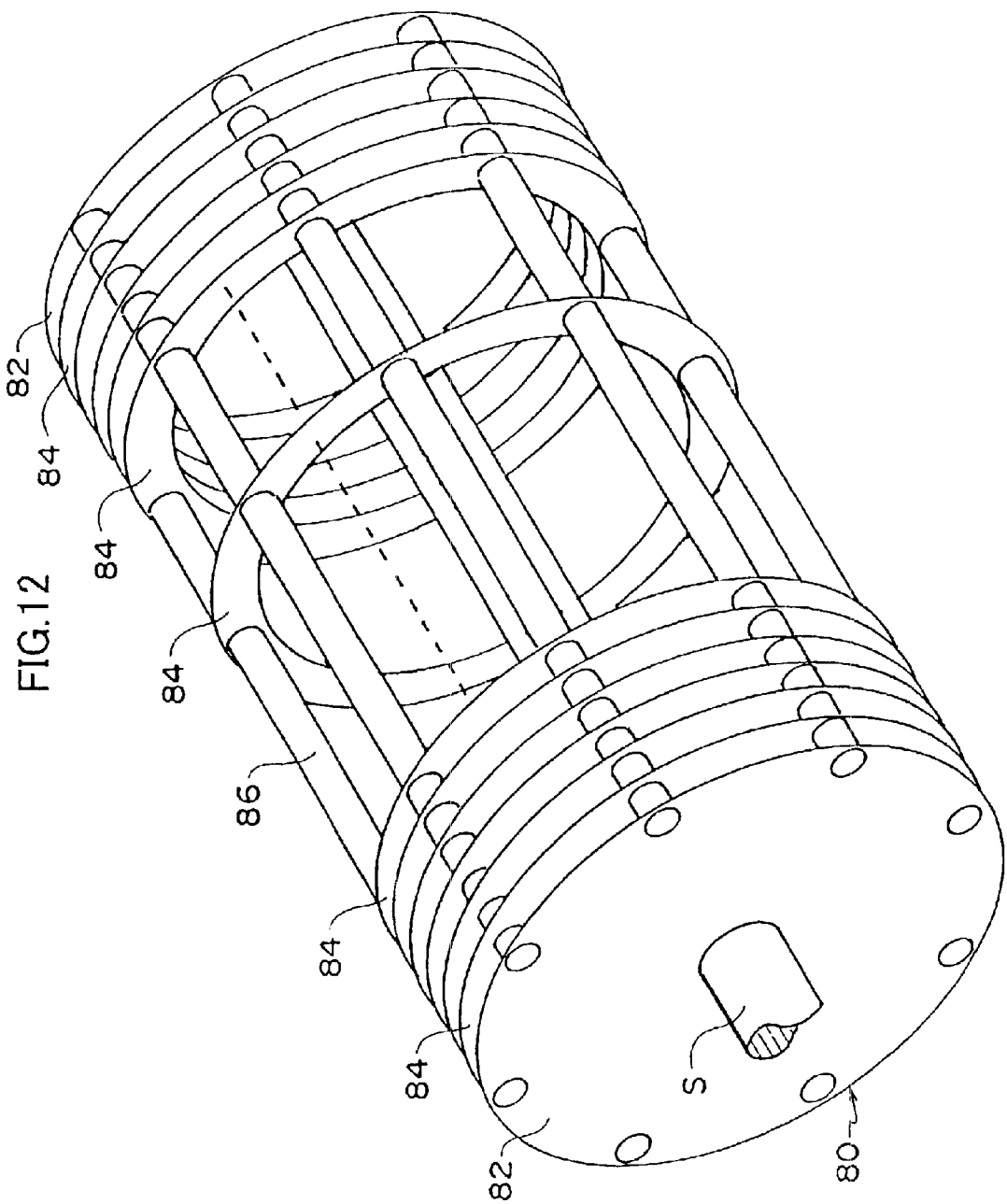
FIG. 12 is a perspective view showing a structure of a rotating container for the agitating spheres with which the exhaust gas purifier shown in FIG. 11 is equipped.

Details of the agitating sphere rotating container 80, with which the exhaust gas purifier is equipped, are shown in FIG. 12.

As shown in FIG. 11 and FIG. 12, the agitating sphere rotating container 80 has a pair of disc-shaped end plates 82 positioned at the both ends, and the rotating shaft S fixed at a right angle to the end plates 82 at the central portions of the end plates 82.

Donut-shaped plates 84, whose outer diameters are the same as the end plates 82 and which have donut-shaped, flat configurations, are disposed between the pair of end plates 82, concentrically with the end plates 82, at uniform intervals along the axis of the rotating shaft S. The interval between two adjacent donut-shaped plates 84 is preferably smaller than the diameter of the agitating spheres 10 so that the agitating spheres 10 do not fall out therefrom. However, when the end plates 82 and the donut-shaped plates are enveloped to hold the agitating spheres inside, the interval between two adjacent donut-shaped plates 84 may be greater than or equal to the diameter of the agitating spheres 10.

As shown in FIG. 12, the donut-shaped plates 84 are maintained in the aforementioned positions by donut-shaped plate holding members 86. The donut-shaped plate holding members 86 are rod-shaped members provided parallel to the rotating shaft S between the pair of end plates 82.

In the example shown in FIG. 12, eight donut-shaped plate holding members 86 are provided at the peripheral portions of the end plates 82. However, the number of donut-shaped plate holding members 86 is not limited to eight.

Through holes, through which the donut-shaped plate holding members 86 respectively pass, are provided in the peripheral portions of the end plates 82 and in the donut-shaped plates 84. The donut-shaped plate holding members 86 are inserted through these through holes and fixed to the end plates 82 and the donut-shaped plates 84.

For example, metal rods and bolts can be used as the donut-shaped plate holding members 86.

When metal rods are used as the donut-shaped plate holding members 86, the donut-shaped plate holding members 86 can be fixed to the end plates 82 and the donut-shaped plates 84 by, for example, brazing or the like.

When bolts are used as the donut-shaped plate holding members 86, collars of predetermined lengths can be inserted between two adjacent donut-shaped plates 84 at the donut-shaped plate holding members 86, and the donut-shaped plates 84 can be held at intervals equal to the lengths of the collars.

If bolts are used as the donut-shaped plate holding members 86, it is preferable because assembly and disassembly of the agitating sphere rotating container 80 can be carried out easily.

The rotating shaft S can be rotated by the output from the engine that discharges the exhaust gas to be processed.

If the rotating shaft S is rotated by the output from the engine, the rotational speed of the agitating sphere rotating container 80 can be increased and decreased in accordance with increases and decreases in the output of the engine. Accordingly, the capacity of the exhaust gas purifier can also be increased and decreased in accordance with increases and decreases in the output of the engine.

Further, the rotating shaft S may be rotated by an electric motor. The speed of the electric motor may be maintained constant regardless of the output of the engine, or may be controlled so as to increase when the acceleration pedal is depressed strongly, i.e., when the engine output increases.

Moreover, the rotating shaft S may be formed so as to rotate by a pendulum. For example, a large-diameter sprocket may be fixed to the rotating shaft of a pendulum, a small-diameter sprocket may be fixed to the rotating shaft S, and by connecting the large-diameter sprocket and the small-diameter sprocket by a chain, the rotating shaft S can be rotated by the pendulum.

In an exhaust gas purifier in which the rotating shaft S is rotated by a pendulum, there is no need for particular power to rotate the agitating sphere rotating container 80.

In the exhaust gas purifier, as shown in FIG. 11, a pair of pulse wave-returning plates 62 are provided from the vicinities of lower end portions at the side plates 6B of the exhaust gas flow guiding duct 6 toward the agitating sphere rotating container 80. The pulse wave-returning plates 62 are formed by punch metal plates, and are provided such that the interval between them decreases toward the top. The pulse wave-returning plates 62 prevent scattering of the exhaust gas from the regions between the agitating sphere rotating container 80 and the side plates 6B of the exhaust gas flow guiding duct 6, and function to guide the exhaust gas into the agitating sphere rotating container 80.

The exhaust gas purifier of the sixth embodiment has a similar structure as the exhaust gas purifier relating to the embodiment 4, except that the agitating sphere accommodating chamber is the agitating sphere rotating container 80, and that the exhaust gas purifier has the pulse wave-returning plates 62.

In the exhaust gas purifier of the sixth embodiment, the exhaust gas is processed while the agitating sphere rotating container 80 is rotated. Thus, while the exhaust gas is being processed, the agitating spheres 10 roll on the inner wall surfaces of the agitating sphere rotating container 80.

Further, the inner wall surfaces of the agitating sphere rotating container 80 are formed by the inner peripheral surfaces of the donut-shaped plates 24. Usually, the thickness of the donut-shaped plates 24 is thin. Thus, the agitating spheres 10 contact with the inner wall surfaces of the agitating sphere rotating container 80 in an extremely small area.

Accordingly, in the exhaust gas purifier of embodiment 6, even when the viscosity of the exhaust gas purifying liquid such as an engine oil is high, the agitating spheres 10 are not fixed to the inner wall surfaces of the agitating sphere rotating container 80.

Further, the exhaust gas purifying liquid is mixed not only by the agitating spheres 10 which move up and down within the agitating sphere rotating container 80 due to the pulse waves of the exhaust gas, but is also mixed by the agitating sphere rotating container 80 itself which rotates or revolves around the rotating shaft S. Thus, the exhaust gas contacts the exhaust gas processing liquid even more intensely.

Thus, in accordance with the exhaust gas purifier of the sixth embodiment, soot in exhaust gas can be removed even more completely.

(7) Embodiment 7

Figure 13:
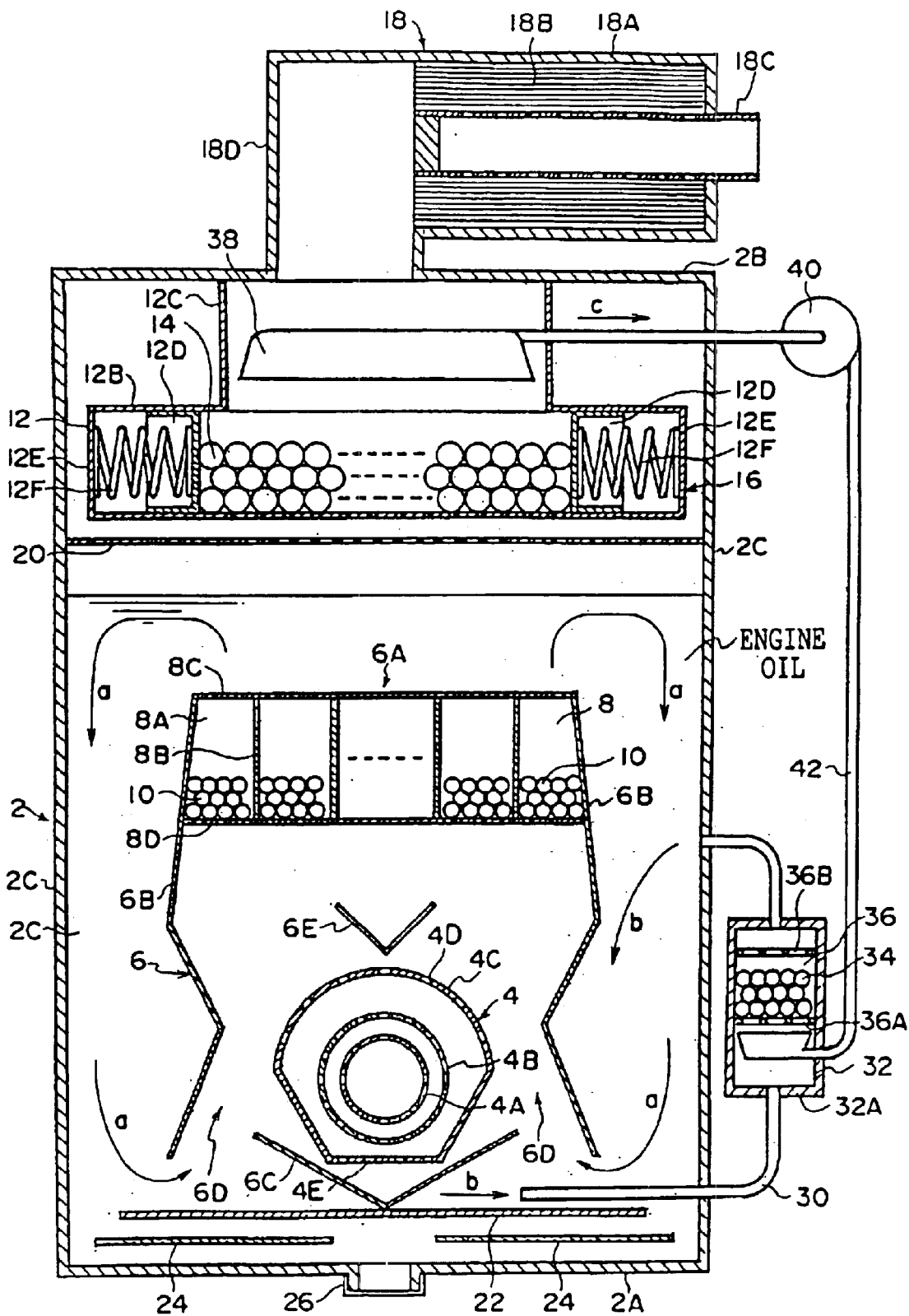
FIG. 13 is a sectional view showing yet another example of the exhaust gas purifier relating to the eighth embodying aspect of the present invention.

An example in which an external circulating flow path circulating the engine oil is provided at the exterior of the exhaust gas purifying tank in the exhaust gas purifier relating to the fourth embodiment, is shown in FIG. 13. In FIG. 13, reference numerals which are the same as those of FIG. 6 and FIG. 7 denote the same elements as the elements denoted by these reference numerals in FIG. 6 and FIG. 7 unless otherwise noted. Note that, in FIG. 13, the cooling conduits 28 are omitted.

As shown in FIG. 13, in the exhaust gas purifier of the fourth embodiment, an external circulating flow path 30 circulating the engine oil stored in the interior of the exhaust gas purifying tank 2 is provided at the outer side of the exhaust gas purifying tank 2.

One end portion of the external circulating flow path 30 is disposed between the bottom plate 6C at the exhaust gas flow guiding duct 6 and the lower plate 22 in the exhaust gas purifying tank 2. The other end passes through the side wall 2C of the exhaust gas purifying tank 2, and is open toward the side wall 6B of the exhaust gas flow guiding duct 6.

An agitating sphere accommodating container 32 which is cylindrical is mounted on the external circulating flow path 30.

A agitating sphere chamber 36, which accommodates agitating spheres 34 at the interior thereof, is formed at the interior of the agitating sphere accommodating container 32. The bottom plate 36A and the ceiling plate 36B of the agitating sphere chamber 36 are provided parallel to one another, and each is formed of a punch metal plate.

On the other hand, an exhaust gas suck-in duct 38, which has a funnel shape, opening downward to guide a portion of the exhaust gas out to the exterior, is provided at the interior of the exhaust gas discharge duct 12C of the floating sphere accommodating chamber 12.

The exhaust gas suck-in duct 38 is connected to the suction side of a centrifugal blower 40 by a conduit.

One end of an exhaust gas blow-in conduit 42, which guides the exhaust gas compressed in the centrifugal blower 40 to the interior of the agitating sphere accommodating container 32, is connected to the output side of the centrifugal blower 40.

The other end portion of the exhaust gas blow-in conduit 42 is positioned in a space, at the interior of the agitating sphere accommodating container 32, between a bottom wall surface 32A of the agitating sphere accommodating chamber 32 and a bottom plate 36A of the agitating sphere chamber 36, and is formed in a funnel shape which opens toward the bottom plate 36A.

As shown in FIG. 13, the exhaust gas purifier of the fourth embodiment has a similar structure to that of the exhaust gas purifier relating to the fourth embodiment, except for the above-described respective points.

In the exhaust gas purifier, when the centrifugal blower 40 is rotated, a portion of the exhaust gas which flows through the interior of the exhaust gas discharging duct 12C is sucked-in toward the centrifugal blower 40 from the exhaust gas suck-in conduit 38 as shown by arrow c in FIG. 8.

The exhaust gas which has been sucked into the centrifugal blower 40 passes through the exhaust gas blow-in conduit 42, and is blown-in into the region between the bottom wall surface 32A of the agitating sphere accommodating container 32 and the bottom plate 36A of the agitating sphere chamber 36.

Due to the pressure of the exhaust gas, the agitating spheres 34 move up and down. Then, the engine oil within the agitating sphere accommodating container 32 is pushed out upwardly, and the pressure of the interior of the agitating sphere accommodating container 32 is reduced.

Accordingly, engine oil is sucked into the interior of the agitating sphere accommodating container 32 from the end portion of the exterior circulating flow path 30 which is positioned between the bottom plate 6C and the lower plate 22.

In this way, a circulating flow of engine oil directed downwardly is generated at the interior of the exhaust gas purifying tank 2 as shown by arrow b in FIG. 8.

A circulating flow b of engine oil has the same direction as that of the circulating flow a. Thus, the circulating flow a of engine oil is accelerated by the circulating flow b.

Accordingly, in the exhaust gas purifier relating to the seventh embodiment, a circulating flow, which is even stronger than in the exhaust gas purifier relating to the fourth embodiment, is generated at the interior of the exhaust gas purifying tank 2. Thus, the soot in the exhaust gas is even more efficiently caught up in the exhaust gas purifying liquid and removed.

2. EXAMPLES

The results of carrying out a test on the purification of exhaust gas of a diesel vehicle and a gasoline vehicle using the exhaust gas purifier shown in FIG. 3 are as follows.

type of engine oil: 10W-30 multigrade oil amount of engine oil: 80 liters amount of water: 22 liters A. Diesel Vehicle A Nissan Atlas (cubic capacity 3300 cc, engine type ED33) manufactured by Nissan Motor Co., Ltd., and an Isuzu Elf (cubic capacity 3600 cc, engine type 4BE1) manufactured by Isuzu Motors Ltd. were used as the diesel vehicles.

The concentrations of soot (black smoke), nitrogen oxides, and sulfur oxides were measured for the exhaust gas which had not passed through the exhaust gas purifier, i.e., exhaust gas before purification, and the exhaust gas which had passed through the exhaust gas purifier, i.e., exhaust gas after purification, as the exhaust gasses of the diesel vehicle.

The concentration of the soot was measured by using a black smoke measuring device (type: DSM-10, Ministry of Transport number: DS-2) manufactured by Banzai Co., Ltd., and is expressed as the reading (%) of the black smoke measurer.

The engine of the diesel vehicle was made to rotate at a low speed of about 500 rpm, and from this state, the engine was raced such that the rotational speed was increased to about 1500 rpm. In this state, measurement of the concentration of black smoke was carried out. This measurement was repeated three times, and the average value was taken. The results are shown in Table 1.

TABLE 1

| | Concentration of Black Smoke | |
|---|---|---|
| Vehicle Type | Before Purification | After Purification |
| Nissan Atlas | 28% (first time) | 2% (first time) |
| | 34% (second time) | 2% (second time) |
| | 28% (third time) | 0% (third time) |
| | 30% (average) | 1.3% (average) |
| Isuzu Elf | 26% (first time) | 2% (first time) |
| | 26% (second time) | 2% (second time) |
| | 29% (third time) | 0% (third time) |
| | 27% (average) | 1.3% (average) |

The concentrations of nitrogen oxides and sulfur oxides were measured by rotating the engine of the diesel vehicle for 1 hour at 1700 rpm. For the exhaust gas before purification, the total nitrogen concentration and the sulfuric acid ion concentration of the water extracted from the water tank in the exhaust gas purifier were measured. For the exhaust gas after purification, the exhaust gas discharged from the exhaust gas cleaner in the exhaust gas purifier was made to flow through water for one hour, and for this water, measurement was carried out in the same way as measured for the exhaust gas before purification.

The results are shown in following Table 2.

TABLE 2

| Item | Before Purification | After Purification |
|---|---|---|
| nitrogen oxides (total nitrogen) | 18 (mg/liters) | 1.6 (mg/liters) |
| sulfur oxides (sulfuric acid ions) | 75 (mg/liters) | 22 (mg/liters) |

B. Gasoline Vehicle

A Nissan Bluebird (cubic capacity 1800 cc) manufactured by Nissan Motor Co., Ltd. was used as the gasoline vehicle.

For the gasoline vehicle, the concentrations of hydrocarbons and carbon monoxide were measured for the exhaust gas before purification and the exhaust gas after purification.

The hydrocarbons and carbon monoxide in the exhaust gas were measured by using a CO/HC tester (type: AU7CH, Ministry of Transport inspection number 7MD6653) manufactured by Yokogawa Electric Corp., in a state in which the engine was rotated at 700 rpm. The results are shown in following Table 3.

TABLE 3

| Item | Before Purification | After Purification |
| --- | --- | --- |
| carbon monoxide | 4% | 0.5% |
| hydrocarbons | 350 ppm | 50 ppm |

From the results shown in above Table 1 and Table 2, it can be understood that, in accordance with the exhaust gas purifier of example 2, the black smoke (soot) in the exhaust gas of a diesel vehicle can be almost completely removed, and that nitrogen oxides and sulfur oxides also can be removed well. Further, from the results shown in above Table 3, it can be understood that carbon monoxide and hydrocarbons in the exhaust gas of a gasoline vehicle can also be removed well.

Industrial Applicability

In the exhaust gas purifier relating to the first embodying aspect of the present invention, the exhaust gas which is to be purified is introduced to the bottom portion of the exhaust gas purifying tank through the exhaust gas introducing flow path. Thus, the exhaust gas rises in the exhaust gas purifying liquid which is stored in the exhaust gas purifying tank. Here, the exhaust gas purifying liquid is a liquid which is selected from lubricating oils and animal and vegetable oils. Lubricating oils and animal and vegetable oils are liquids which have a high affinity to soot within the exhaust gas, and further, have a surface tension which is lower and a viscosity which is higher than water. Thus, the exhaust gas purifying liquid is dragged by the rising flow of the exhaust gas, and rises in the exhaust gas purifying tank. Then, at the liquid surface, the exhaust gas purifying liquid is pushed toward the side walls of the exhaust gas purifying tank by the rising flow. Accordingly, at the interior of the exhaust gas purifying tank, a circulating flow of the exhaust gas purifying liquid, which rises toward the liquid surface from the exhaust gas introducing flow path and falls down along the side wall surfaces of the exhaust gas purifying tank, arises. The soot in the exhaust gas is caught up in the exhaust gas purifying liquid due to this circulating flow. Thus, in accordance with the exhaust gas purifier of the present invention, soot in the exhaust gas can be removed effectively.

Further, in a diesel engine having a large cylinder capacity such as an engine of a large-sized truck, bus, construction machinery, boat or the like, the exhaust pressure reaches 5 to 6 atm or even greater than that. However, as described above, because the viscosity of the exhaust gas purifying liquid used in the present invention is high, even when an exhaust gas having such a high exhaust pressure is introduced, there is no splash due to the pressure of the exhaust gas and no scattering to the exterior.

Further, the temperature of the exhaust gas reaches 300 to 500° C. However, both lubricating oils and animal and vegetable oils which are used as the exhaust gas purifying liquid are non-volatile at a room temperature. Thus, there is no evaporating due to the heat of the exhaust gas.

The exhaust gas purifier relating to the second embodying aspect of the present invention has, in addition to a first exhaust gas purifying tank which is similar to the exhaust gas purifying tank in the exhaust gas purifier relating to the first embodying aspect, a second exhaust gas purifying tank accommodating, at an interior, a nitrogen oxide removing liquid which has affinity to nitrogen oxides and sulfur oxides.

Accordingly, in accordance with this exhaust gas purifier, not only soot in the exhaust gas, but also nitrogen oxides and sulfur oxides and the like can be removed effectively.

The exhaust gas purifier relating to the third embodying aspect of the present invention is an exhaust gas purifier having a purifying liquid discharge preventing means, which prevents the purifying liquid from being discharged out of the exhaust gas purifying tank concomitantly with the exhaust gas, at the exhaust gas purifying tank of the exhaust gas purifier relating to the first embodiment. Further, the exhaust gas purifier relating to the fourth embodying aspect of the present invention is provided with the purifying liquid discharge preventing means at the first exhaust gas purifying tank at the exhaust gas purifier relating to the second aspect.

Accordingly, even if a portion of the exhaust gas purifying liquid scatters in a splash due to the pressure of the exhaust gas, it can be returned to the exhaust gas purifying tank by the purifying liquid discharge preventing means. Thus, discharging of the exhaust gas purifying liquid into the atmosphere concomitantly with the exhaust gas can be prevented effectively.

The exhaust gas purifier relating to the fifth embodying aspect of the present invention is provided with a nitrogen oxide removing liquid discharge preventing means, which prevents scattering of the nitrogen oxide removing liquid, at the second exhaust gas purifying tank in the exhaust gas purifier relating to the second aspect.

Accordingly, in the exhaust gas purifier, even if the nitrogen oxide removing liquid scatters in mist-form due to the pressure of the exhaust gas, it can be returned to the second exhaust gas purifying tank by the nitrogen oxide removing liquid discharge preventing means. Thus, discharging of the nitrogen oxide removing liquid into the atmosphere concomitantly with the exhaust gas can be prevented.

The exhaust gas purifier relating to the sixth aspect of the present invention is provided with a floating sphere filter and/or an exhaust gas flow bending means as the purifying liquid discharge preventing means.

In an exhaust gas purifier equipped with a floating sphere filter, the exhaust gas purifying liquid which scatters from the exhaust gas purifying tank adheres to and coagulates on the surfaces of the floating spheres in the floating sphere filter. Oil droplets grow and drip down toward the exhaust gas purifying tank.

On the other hand, among the above-described exhaust gas purifiers, in an exhaust gas purifier equipped with the exhaust gas flow bending means, the exhaust gas flow, which contains the drop-form exhaust gas purifying liquid, is bent by the exhaust gas flow bending means. The mass of the drops of the exhaust gas purifying liquid in the exhaust gas flow is much larger than the exhaust gas. Thus, the drops cannot follow the exhaust gas flow which is bent by the exhaust gas flow bending means, and adhere to the inner walls or the like of the exhaust gas purifying tank, and are removed from the exhaust gas flow.

The floating sphere filter and the exhaust gas flow bending means effectively remove the exhaust gas purifying liquid from the exhaust gas flow, while both having simple structures.

The exhaust gas purifier relating to the seventh aspect of the present invention is equipped with the floating sphere filter and/or the exhaust gas flow bending means as the nitrogen oxide removing liquid discharge preventing means. The floating sphere filter and the exhaust gas flow bending means, with which the exhaust gas purifier is provided, function similarly to the floating sphere filter and the exhaust gas flow bending means in the exhaust gas purifier relating to the sixth embodying aspect, and remove the fine-drop-form nitrogen oxide removing liquid which is contained in the exhaust gas.

Accordingly, the nitrogen oxide removing liquid discharge preventing means of the exhaust gas purifier effectively removes the nitrogen oxide removing liquid from the exhaust gas flow, while having a simple structure.

The exhaust gas purifier relating to the eighth aspect of the present invention has an exhaust gas purifying tank, an exhaust gas introducing means, and an exhaust gas guide-out flow path. The exhaust gas introducing means has an exhaust gas jetting portion and an exhaust gas flow guiding duct which accommodates the exhaust gas jetting portion.

In the exhaust gas purifier, the exhaust gas, which is jetted from the exhaust gas jetting portion, is discharged into the exhaust gas purifying tank from an opening portion provided at another end of the exhaust gas flow guiding duct. Thus, the exhaust gas purifying liquid in the interior of the exhaust gas flow guiding duct also is dragged by the flow of the exhaust gas, and is guided-out into the exhaust gas purifying tank from the opening portion.

In this way, because the pressure of the interior of the exhaust gas flow guiding duct is reduced, the exhaust gas purifying liquid flows into the interior of the exhaust gas flow guiding duct from the opening portion which is provided at the one end of the exhaust gas flow guiding duct. A circulating flow of the exhaust gas purifying liquid arises in the exhaust gas purifying tank.

Accordingly, harmful solids such as soot and the like in the exhaust gas are particularly effectively caught up in the exhaust gas purifying liquid and removed.

In the exhaust gas purifier relating to the ninth aspect of the present invention, an exhaust gas purifying liquid agitating portion is provided in the vicinity of the opening portion provided at the other end of the exhaust gas flow guiding duct. Thus, when the exhaust gas purifying liquid, which is guided-out into the interior of the exhaust gas purifying tank from the exhaust gas flow guiding duct, flows through the exhaust gas purifying liquid agitating portion, it is agitated at the exhaust gas purifying liquid agitating portion.

Accordingly, the exhaust gas purifying liquid more intensely contacts the exhaust gas. Therefore, the soot in the exhaust gas is removed more effectively.

In the exhaust gas purifier relating to the tenth aspect of the present invention, the exhaust gas jetting portion is formed to jet the exhaust gas out upwardly and obliquely upwardly. Thus, the exhaust gas and the exhaust gas purifying liquid flow naturally.

In the exhaust gas purifier relating to the eleventh aspect of the present invention, the exhaust gas purifying liquid agitating portion is equipped with a agitating sphere accommodating chamber which is formed such that exhaust gas can flow through it, and agitating spheres which are accommodated so as to be able to floating at an interior of the agitating sphere accommodating chamber. Thus, the agitating spheres move up and down and left and right, due to the exhaust gas which is passing through the agitating sphere accommodating chamber. Accordingly, the exhaust gas purifying liquid which passes through the agitating sphere accommodating chamber is agitated by the agitating spheres, and is intensely mixed together with the exhaust gas.

In the exhaust gas purifier relating to the twelfth aspect of the present invention, the agitating sphere rotating container in the agitating sphere accommodating chamber is formed so as to be able to rotate around an axis. The agitating sphere rotating container rotates while processing the exhaust gas. Accordingly, even when the exhaust gas purifying liquid adsorbs a large amount of soot and the viscosity rises, or when a highly viscous lubricating oil is used as the exhaust gas purifying liquid, and the like, the agitating spheres do not stick on the inner walls of the agitating sphere rotating container.

What is claimed is:

1. An exhaust gas purifier comprising:

an exhaust gas purifying tank accommodating, at an interior, an exhaust gas purifying liquid selected from lubricating oils and animal and vegetable oils;

an exhaust gas introducing flow path provided at a bottom portion of the exhaust gas purifying tank, and introducing exhaust gas which is to be purified into the exhaust gas purifying liquid accommodated in the exhaust gas purifying tank; and an exhaust gas guide-out flow path which guides exhaust gas, which has flowed through the exhaust gas purifying liquid, out to an exterior of the exhaust gas purifying tank, wherein a floating sphere filter which is equipped with floating spheres, which are a group of spheres, and a floating sphere accommodating chamber, which accommodates the floating spheres at an interior and which has a bottom plate and a ceiling plate formed such that the exhaust has can flow therethrough and whose side walls are formed by floating walls which are thrust so as to push the floating spheres to return toward a central portion, is provided at the exhaust gas guide-out flow path.

2. An exhaust gas purifier comprising:

a first exhaust gas purifying tank accommodating, at an interior, an exhaust gas purifying liquid selected from lubricating oils and animal and vegetable oils;

a second exhaust gas purifying tank accommodating, at an interior, a nitrogen oxide removing liquid which has affinity with respect to nitrogen oxides and sulfur oxides;

a first exhaust gas introducing flow path provided at a bottom portion of the first exhaust gas purifying tank, and introducing exhaust gas which is to be purified into the exhaust gas purifying liquid accommodated in the first exhaust gas purifying tank;

a second exhaust gas introducing flow path provided at a bottom portion of the second exhaust gas purifying tank, and introducing exhaust gas, which has been guided-out from the first exhaust gas purifying tank, into the nitrogen oxide removing liquid accommodated in the second exhaust gas purifying tank; and an exhaust gas guide-out flow path which guides exhaust gas, which has been introduced into the exhaust gas purifying liquid, out to an exterior of the second exhaust gas purifying tank, wherein a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at both of the second exhaust gas introducing flow path and the exhaust gas guide-out flow path.

3. An exhaust gas purifier according to claim 2, wherein the nitrogen oxide removing liquid is water.

4. An exhaust gas purifier having an exhaust gas purifying tank accommodating, at an interior, an exhaust gas purifying liquid selected from lubricating oils and animal and vegetable oils; an exhaust gas introducing means provided within the exhaust gas purifying tank, and introducing exhaust gas into the exhaust gas purifying liquid accommodated in the exhaust gas purifying tank; and an exhaust gas guide-out flow path which guides out exhaust gas which has flowed through the exhaust gas purifying liquid, wherein the exhaust gas introducing means is equipped with:
an exhaust gas jetting portion which jets exhaust gas in a given direction; and
an exhaust gas flow guiding duct which extends along a direction of jetting exhaust gas at the exhaust gas jetting portion, and a purifying liquid return opening, through which the exhaust gas purifying liquid flows in, is provided at one end of the exhaust gas flow guiding duct, and an opening portion, through which exhaust gas purifying liquid which has flowed through an interior flows out, is provided at another end of the exhaust gas flow guiding duct, and the exhaust gas jetting portion is accommodated in a vicinity of the purifying liquid return opening, and
a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at the exhaust gas guide-out flow path.

5. An exhaust gas purifier having an exhaust gas purifying tank accommodating, at an interior, an exhaust gas purifying liquid selected from lubricating oils and animal and vegetable oils; an exhaust gas introducing means provided within the exhaust gas purifying tank, and introducing exhaust gas into the exhaust gas purifying liquid accommodated in the exhaust gas purifying tank; and an exhaust gas guide-out flow path which guides out exhaust gas which has flowed through the exhaust gas purifying liquid, wherein the exhaust gas introducing means is equipped with:
an exhaust gas jetting portion which jets exhaust gas in a given direction; and
an exhaust gas flow guiding duct which extends along a direction of jetting exhaust gas at the exhaust gas jetting portion, and a purifying liquid return opening, through which the exhaust gas purifying liquid flows in, is provided at one end of the exhaust gas flow guiding duct, and an opening portion, through which exhaust gas purifying liquid which has flowed through an interior flows out, is provided at another end of the exhaust gas flow guiding duct, and the exhaust gas jetting portion is accommodated in a vicinity of the purifying liquid return opening, and
an exhaust gas purifying liquid agitating portion, which is equipped with a agitating sphere accommodating chamber, which is formed such that exhaust gas can flow therethrough, and agitating spheres, which are accommodated so as to be able to floating at an interior of the agitating sphere accommodating chamber, and which mixes exhaust gas purifying liquid which flows out from an interior of the exhaust gas flow guiding duct, is provided in a vicinity of the opening portion provided at the other end of the exhaust gas flow guiding duct.

6. An exhaust gas purifier according to claim 5, wherein a floating sphere filter which is equipped with floating spheres, which are a group of spheres, and a floating sphere accommodating chamber, which accommodates the floating spheres at an interior and which has a bottom plate and a ceiling plate formed such that the exhaust gas can flow therethrough and whose side walls are formed by floating walls which are thrust so as to push the floating spheres to return toward a central portion, is provided at the exhaust gas guide-out flow path.

7. An exhaust gas purifier according to any one of claims 4 through 6, wherein the exhaust gas jetting portion is formed so as to jet the exhaust gas upwardly and obliquely upwardly.

8. An exhaust gas purifier according to any one of claims 5 through 6, wherein the agitating sphere accommodating chamber is a agitating sphere rotating container which is formed so as to be able to rotate around an axis which extends in a horizontal direction.

9. An exhaust gas purifier according to any one of claims 1 through 6, wherein the exhaust gas purifying liquid is a lubricating oil.

10. An exhaust gas purifier according to claim 9, wherein the lubricating oil has a viscosity of 5 to 2,000 cSt.

* * * * *